(12) United States Patent
Osaki

(10) Patent No.: US 8,849,805 B2
(45) Date of Patent: Sep. 30, 2014

(54) INFORMATION PROCESSING APPARATUS, INFORMATION PROCESSING METHOD, INFORMATION PROCESSING PROGRAM, AND RECORDING MEDIUM

(71) Applicant: Rakuten, Inc., Tokyo (JP)

(72) Inventor: Shoichi Osaki, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/112,430

(22) PCT Filed: Nov. 8, 2012

(86) PCT No.: PCT/JP2012/078968
§ 371 (c)(1),
(2), (4) Date: Oct. 17, 2013

(87) PCT Pub. No.: WO2013/161107
PCT Pub. Date: Oct. 31, 2013

(65) Prior Publication Data
US 2014/0081955 A1    Mar. 20, 2014

(30) Foreign Application Priority Data

Apr. 26, 2012   (JP) ................................. 2012-100557

(51) Int. Cl.
*G06F 17/30*    (2006.01)
*G06Q 10/10*    (2012.01)

(52) U.S. Cl.
CPC .......... *G06F 17/30867* (2013.01); *G06Q 10/10* (2013.01)
USPC .......... 707/722; 707/758; 705/26.5; 705/26.7

(58) Field of Classification Search
CPC .................... G06F 17/30867; G06F 17/30522; G06F 17/30554; Y10S 707/99933

USPC ......... 707/722, 758, 999.003; 705/26.5, 26.7, 705/27
See application file for complete search history.

(56) References Cited

U.S. PATENT DOCUMENTS 5,832,446 A * 11/1998 Neuhaus ......................... 705/15
6,327,574 B1 * 12/2001 Kramer et al. .............. 705/14.66
(Continued)

FOREIGN PATENT DOCUMENTS

JP    2002-063178 A    2/2002
JP    2005-276171    * 10/2005    .............. G06F 17/60
(Continued)

OTHER PUBLICATIONS

Hiroki Ito, et al., "Gourmet Searcher", Information Processing Society of Japan, Mar. 8, 2010, pp. 4-781-4-782, vol. 4, No. 4ZL-7.

*Primary Examiner* — Phuong Thao Cao
(74) *Attorney, Agent, or Firm* — Sughrue Mion, PLLC

(57) ABSTRACT

It is possible to present a recipe according to a request reflecting how strongly the user feels for cooking. An information processing apparatus acquires a first feeling degree specified by a user as a degree of strength of feelings for cooking. The information processing apparatus acquires a second feeling degree of each recipe on the basis of a plurality of attributes of the recipe. The second feeling degree is calculated as the degree of strength of feelings for cooking. The plurality of attributes are identified from the recipe stored in a storage means. The information processing apparatus searches for one or more recipes whose second feeling degrees within a range according to the first feeling degree is calculated, and causes the found recipe to be presented.

20 Claims, 21 Drawing Sheets

(56) References Cited

U.S. PATENT DOCUMENTS

| | | | |
|---|---|---|---|
| 6,980,999 B1* | 12/2005 | Grana | 707/803 |
| 7,373,318 B2* | 5/2008 | Kutsumi et al. | 705/26.7 |
| 7,558,788 B1* | 7/2009 | Herdman | 1/1 |
| 7,890,499 B1* | 2/2011 | Boswell | 707/722 |
| 8,200,548 B2* | 6/2012 | Wiedl | 705/26.5 |
| 2001/0025279 A1* | 9/2001 | Krulak et al. | 707/3 |
| 2001/0044759 A1* | 11/2001 | Kutsumi et al. | 705/27 |
| 2002/0002554 A1* | 1/2002 | Herdman | 707/10 |
| 2003/0046188 A1* | 3/2003 | Orozco | 705/27 |
| 2005/0071328 A1* | 3/2005 | Lawrence | 707/3 |
| 2005/0102282 A1* | 5/2005 | Linden | 707/3 |
| 2006/0053184 A1* | 3/2006 | Grana | 707/204 |
| 2007/0158335 A1* | 7/2007 | Mansbery | 219/505 |
| 2007/0255623 A1* | 11/2007 | Firer et al. | 705/15 |
| 2009/0276487 A1* | 11/2009 | Jensen et al. | 709/203 |
| 2009/0287644 A1* | 11/2009 | Crosby | 707/3 |
| 2009/0326687 A1* | 12/2009 | McCoy | 700/90 |
| 2011/0055044 A1* | 3/2011 | Wiedl | 705/26.5 |
| 2011/0102324 A1* | 5/2011 | Hwang | 345/168 |
| 2011/0119130 A1* | 5/2011 | Agan et al. | 705/14.49 |
| 2011/0151072 A1* | 6/2011 | Anderson et al. | 426/231 |
| 2012/0016764 A1* | 1/2012 | Ouimet | 705/26.7 |
| 2012/0101890 A1* | 4/2012 | Matsushita et al. | 705/14.25 |
| 2012/0221571 A1* | 8/2012 | Orman | 707/737 |
| 2012/0226698 A1* | 9/2012 | Silvestre et al. | 707/741 |
| 2013/0073421 A1* | 3/2013 | Poisson | 705/26.7 |
| 2013/0185646 A1* | 7/2013 | Wiggins et al. | 715/739 |
| 2013/0191177 A1* | 7/2013 | Wiggins et al. | 705/7.27 |
| 2013/0224694 A1* | 8/2013 | Moore et al. | 434/127 |

FOREIGN PATENT DOCUMENTS

| | | | | |
|---|---|---|---|---|
| JP | 2008-310742 A | | 12/2008 | |
| JP | 2011-191980 | * | 9/2011 | G06Q 10/00 |

* cited by examiner

FIG.2A

| ATTRIBUTE OF RECIPE | | FEELING DEGREE |
|---|---|---|
| THE NUMBER OF INGREDIENTS TO BE USED | NORMAL INGREDIENT | 1 POINT |
| | SEASONING | 0.1 POINT |
| | BOILED RICE | 0.3 POINTS |
| | WATER | 0 POINT |
| | ... | ... |
| THE NUMBER OF STEPS OF PROCEDURES | | THE NUMBER OF STEPS × 3 POINTS |
| COOKING TIME | 15 MINUTES OR LESS | 1 POINT |
| | 16 TO 30 MINUTES | 2 POINTS |
| | 31 TO 45 MINUTES | 3 POINTS |
| | ... | ... |
| DEGREE OF QUALITY OF INGREDIENTS (COST OF INGREDIENTS PER PERSON) | 500 YEN OR LESS | 1 POINT |
| | 501 TO 1000 YEN | 2 POINT |
| | 1001 TO 1500 YEN | 3 POINTS |
| | ... | ... |

FIG.2B

TITLE OF RECIPE: COOKED TARO

| ATTRIBUTE OF RECIPE | | FEELING DEGREE |
|---|---|---|
| THE NUMBER OF INGREDIENTS TO BE USED | TARO | 1 POINT |
| | SALT | 0.1 POINT |
| | SUGAR | 0.1 POINT |
| | SWEET COOKING RICE WINE | 0.1 POINT |
| | SOY SAUCE | 0.1 POINT |
| | GRANULAR SOUP | 1 POINT |
| | SUBTOTAL | 2.4 POINTS |
| THE NUMBER OF STEPS OF PROCEDURES | 5 | 15 POINTS |
| COOKING TIME | 30 MINUTES | 2 POINTS |
| DEGREE OF QUALITY OF INGREDIENTS | 200 YEN | 1 POINT |
| TOTAL | | 20.4 POINTS |

FIG.6A

| CONVERSION RULE | | FEELING DEGREE |
|---|---|---|
| BEFORE CONVERSION | AFTER CONVERSION | |
| USE GRANULAR SOUP | MAKE SOUP STOCK FROM KELP AND DRIED BONITO | +2 |
| MAKE SOUP STOCK FROM KELP AND DRIED BONITO | USE GRANULAR SOUP | −2 |
| DO NOT SAUTE MINCED ONIONS BEFORE PUTTING THEM INTO A POT | SAUTE MINCED ONIONS OVER LOW HEAT AND THEN PUT THEM INTO A POT | +3 |
| SAUTE MINCED ONIONS OVER LOW HEAT AND THEN PUT THEM INTO A POT | DO NOT SAUTE MINCED ONIONS BEFORE PUTTING THEM INTO A POT | −3 |
| HEAT USING A MICROWAVE OVEN | BOIL IN A POT | +2 |
| BOIL IN A POT | HEAT USING A MICROWAVE OVEN | −2 |
| USE PRETREATED TARO | PRETREAT TARO | +3 |
| PRETREAT TARO | USE PRETREATED TARO | −3 |
| ... | ... | ... |

FIG.6B

| CONVERSION RULE | | FEELING DEGREE |
|---|---|---|
| BEFORE CONVERSION | AFTER CONVERSION | |
| KELP | HIGH-GRADE KELP MADE IN VV | +1 |
| BEEF | KELP MADE IN WW | −1 |
| AFTER CONVERSION | OO JAPANESE BEEF A5 RANK | +3 |
| ... | ... | ... |

FIG.11A
RECIPE INFORMATION DB  12a

| RECIPE ID |
|---|
| RECIPE TYPE |
| COPY NUMBER |
| PUBLISHED DATE AND TIME |
| USER ID |
| CATEGORY ID |
| RECIPE TITLE |
| DISH NAME |
| COOKING TIME |
| DISH IMAGE |
| INGREDIENT INFORMATION |
| COMMENT |
| PROCEDURE INFORMATION |
| FEELING DEGREE |

FIG.11B
INGREDIENT INFORMATION

| THE NUMBER OF TARGET PEOPLE | |
|---|---|
| INGREDIENT COST | |
| INGREDIENT 1 | INGREDIENT NAME |
| | AMOUNT |
| INGREDIENT 2 | INGREDIENT NAME |
| | AMOUNT |
| ... | |

FIG.11C
PROCEDURE INFORMATION

| PROCEDURE 1 | PROCEDURE TEXT |
|---|---|
| | PROCEDURE IMAGE |
| PROCEDURE 2 | PROCEDURE TEXT |
| | PROCEDURE IMAGE |
| ... | |

FIG.11D  12b
RECIPE CONVERSION INFORMATION DB

| CONVERSION ID |
|---|
| CONVERSION RULE INFORMATION |
| FEELING DEGREE |

FIG.11E
RECIPE MEMBER DB  12c

| USER ID |
|---|
| FEELING DEGREE |
| RECIPE ID |
| REPORT ID |

FIG.11F
ITEMS-FOR-SALE INFORMATION DB  2a

| SHOP ID |
|---|
| ITEM ID |
| CATEGORY ID |
| ITEM NAME |
| URL OF ITEM FOR SALE IMAGE |
| ITEM DESCRIPTION |
| AMOUNT |
| ITEM PRICE |

FIG.11G
MEMBER INFORMATION DB  3a

| USER ID |
|---|
| PASSWORD |
| NICKNAME |
| NAME |
| DATE OF BIRTH |
| GENDER |
| POSTAL CODE |
| ADDRESS |
| PHONE NUMBER |
| EMAIL ADDRESS |

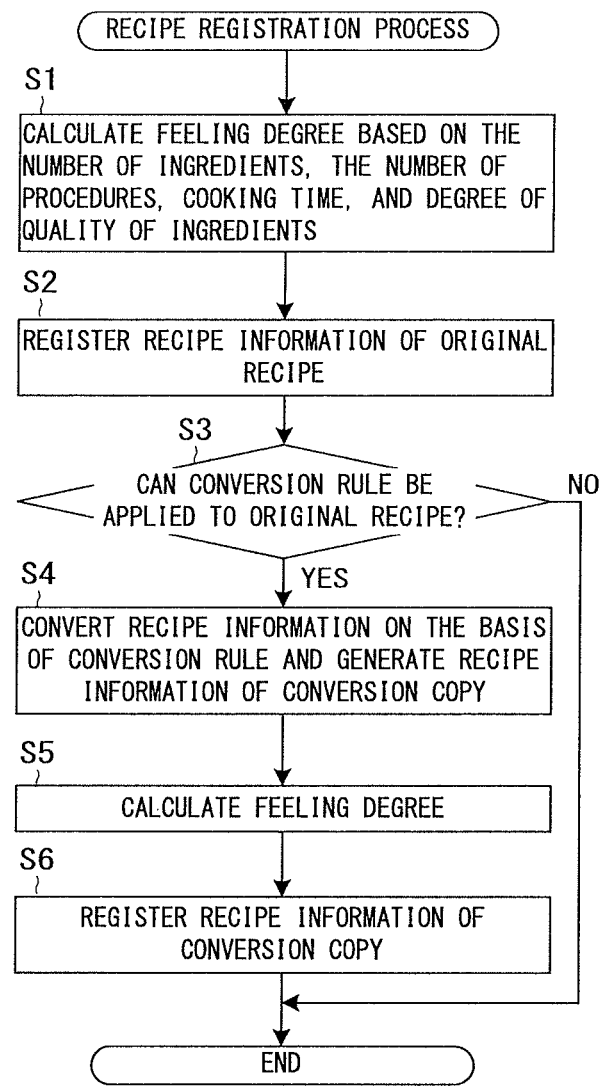

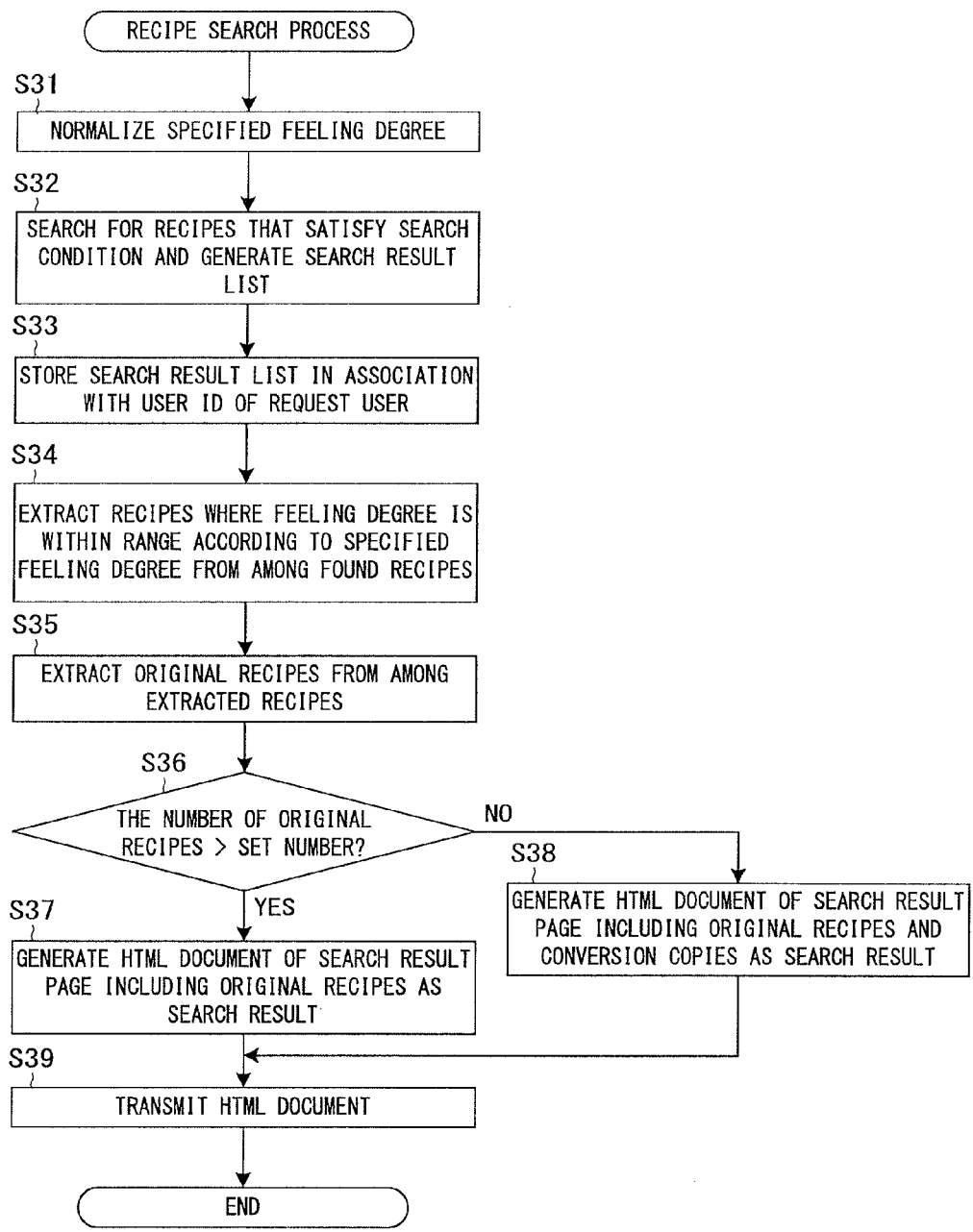

FIG.16A
| SPECIFIED FEELING DEGREE | RECIPE WHOSE REPORT IS POSTED | |
|---|---|---|
| | COOKING TIME | THE NUMBER OF PROCEDURES |
| 10 | 20 | 2 |
| 30 | 40 | 5 |
FIG.16B
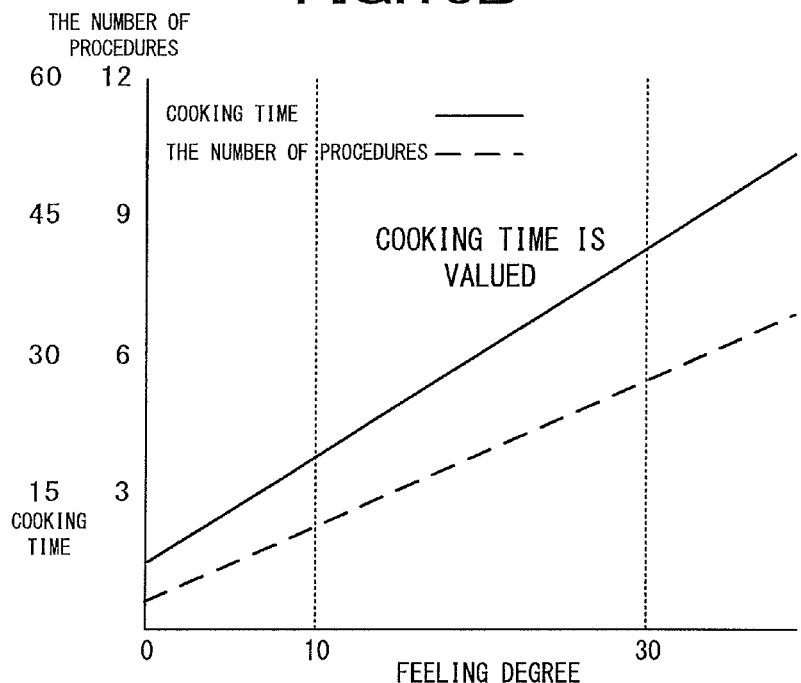
FIG.16C
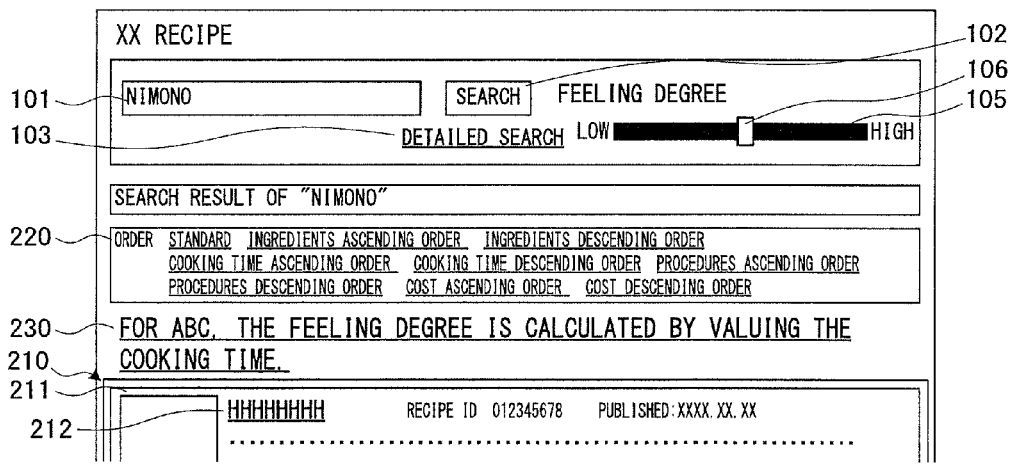

FIG.21A
FIG.21B
| ITEM NUMBER | ITEM NAME | SPECIFICATION | QUANTITY | UNIT PRICE | SUBTOTAL | DELETE |
|---|---|---|---|---|---|---|
| XXXXXX | TARO M SIZE | 8 PIECES | 1 | 399 | 399 | DELETE |
| XXXXXX | XYZ GRANULAR SOUP | 50 g | 1 | 280 | 280 | DELETE |
ACCOUNT
FIG.21C

INFORMATION PROCESSING APPARATUS, INFORMATION PROCESSING METHOD, INFORMATION PROCESSING PROGRAM, AND RECORDING MEDIUM

CROSS REFERENCE TO RELATED APPLICATIONS

This application is a National Stage of International Application No. PCT/JP2012/078968 filed Nov. 8, 2012, claiming priority based on Japanese Patent Application No. 2012-100557 filed Apr. 26, 2012, the contents of all of which are incorporated herein by reference in their entirety.

TECHNICAL FIELD

The present invention relates to a technical field of an information processing apparatus and an information processing method which cause a recipe for cooking to be presented.

BACKGROUND ART

Conventionally, techniques are known which search for a recipe on the basis of a search condition specified by a user and present the found recipe. For example, Patent Document 1 discloses a technique in which various search conditions can be specified. Specifically, a user can specify category, calorie, taste, and cooking ingredients as a search condition.

CITATION LIST

Patent Document

Patent Document 1: Japanese Patent Application Laid-Open No. 2002-63178

SUMMARY OF INVENTION

Technical Problem

By the way, how strongly a user feels for cooking varies depending on the occasion. For example, there are a case in which the user wants to cook elaborately by spending time and effort, and a case in which the user wants to cook simply.

Therefore, the present invention is made in view of the above situation, and an object of the present invention is to provide an information processing apparatus, an information processing method, an information processing program, and a recording medium, which can cause a recipe according to a request reflecting how strongly a user feels for cooking to be presented.

Solution to Problem

In order to achieve the above object, the invention described in claim 1 is an information processing apparatus comprising: a first acquisition means that acquires a first feeling degree specified by a user as a degree of strength of feelings for cooking; a second acquisition means that acquires a second feeling degree of each recipe on the basis of a plurality of attributes of the recipe, the second feeling degree being calculated as the degree of strength of feelings for cooking, the plurality of attributes being identified from the recipe stored in a storage means; a search means that searches for one or more recipes whose calculated second feeling degrees are within a range according to the first feeling degree; and a presentation means that causes the recipe found by the search means to be presented.

According to the invention, a recipe is presented in which the feeling degree within a range according to the feeling degree specified by the user is calculated. Therefore, it is possible to present a recipe according to a request reflecting how strongly the user feels for cooking.

The invention described in claim 2 is the information processing apparatus according to claim 1, further comprising: a generation means that converts at least one of a procedure and an ingredient included in an original recipe stored in the storage means into a replaceable procedure or ingredient and thereby generates a recipe whose second feeling degree is different from the second feeling degree of the original recipe, wherein the presentation means is configured to be able to cause the recipe generated by the generation means to be presented.

According to this invention, even when there is no original recipe according to the feeling degree specified by the user, it is possible to cause a recipe according to the feeling degree specified by the user to be presented.

The invention described in claim 3 is the information processing apparatus according to claim 2, wherein the search means searches for one or more original recipes whose calculated second feeling degrees are within the range, and when the number of the original recipes found is smaller than or equal to a preset number, the search means searches for one or more recipes included in the recipes generated by the generation means, the calculated second feeling degrees of the recipes to be searched for being within the range.

According to this invention, it is possible to display an original recipe more preferentially than a recipe generated by converting the original recipe.

The invention described in claim 4 is the information processing apparatus according to claim 2 or 3, wherein the presentation means causes the recipe found by the search means to be presented together with a widget including pointer that is able to be slid by the user to change the first feeling degree, and when the first feeling degree is changed by an operation of the widget displayed together with the recipe, the presentation means causes a certain recipe to be presented, the certain recipe being one of a copy and an original of the recipe presented before, the calculated second feeling degree of the certain recipe being within a range according to the changed first feeling degree.

The user does not necessarily know accurately what the recipe according to the feeling degree specified by the user is in advance. According to this invention, even when the presented recipe is not a recipe desired by the user, it is possible to change the recipe to a recipe desired by the user by a simple operation.

The invention described in claim 5 is the information processing apparatus according to any one of claims 1 to 4, wherein the second acquisition means acquires the second feeling degree calculated by weighting each of the plurality of attributes by a weight based on a designation history of the user designating the attribute as a key for sorting the recipes found by the search means, the designation history being stored in the storage means.

According to this invention, by using the history of designation, it is possible to cause a recipe suited to an individual user to be presented according to an attribute valued by the user.

The invention described in claim 6 is the information processing apparatus according to any one of claims 1 to 5, wherein the second acquisition means acquires the second feeling degree calculated by weighting each of the plurality of attributes by a weight based on a use history of the user using the recipe, the use history being stored in the storage means.

According to this invention, by using the usage history, it is possible to cause a recipe suited to an individual user to be presented according to an attribute valued by the user.

The invention described in claim 7 is the information processing apparatus according to any one of claims 1 to 6, wherein the presentation means causes a search result of recipes found by the search means together with a widget including pointer that is able to be slid by the user to change the first feeling degree, the presentation means causes a recipe specified by the user from the search result to be presented, and when the first feeling degree is changed by an operation of the widget displayed together with the search result, the presentation means causes a search result of certain recipes to be presented, the calculated second feeling degree of the certain recipes being within a range according to the changed first feeling degree.

The user does not necessarily know accurately what the recipe according to the feeling degree specified by the user is in advance. According to this invention, even when the found recipe is not a recipe desired by the user, it is possible to cause a search result of recipes desired by the user to be presented by a simple operation.

The invention described in claim 8 is the information processing apparatus according to any one of claims 1 to 7, wherein when the first feeling degree acquired by the first acquisition means is smaller than or equal to a preset threshold value, the presentation means causes information recommending using of a home delivery service of food to be presented.

According to this invention, it is possible for the user to select a method in which the user need not make a dish when the user thinks it is troublesome to make a dish.

The invention described in claim 9 is the information processing apparatus according to any one of claims 1 to 8, wherein the second feeling degree is calculated based on the plurality of attributes including an attribute that affects time and effort to cook.

According to this invention, the user can specify how much time and effort the user spends to secure the quality of the dish.

The invention described in claim 10 is the information processing apparatus according to any one of claims 1 to 9, wherein the second feeling degree is calculated based on the plurality of attributes including a degree of quality of ingredients used for cooking.

According to this invention, the user can specify how much money the user spends to secure the quality of the dish.

The invention described in claim 11 is an information processing method performed by a computer, the method comprising: a first acquisition step of acquiring a first feeling degree specified by a user as a degree of strength of feelings for cooking; a second acquisition step of acquiring a second feeling degree of each recipe on the basis of a plurality of attributes of the recipe, the second feeling degree being calculated as the degree of strength of feelings for cooking, the plurality of attributes being identified from the recipe stored in a storage means; a search step searching for one or more recipes whose calculated second feeling degrees are within a range according to the first feeling degree; and a presentation step causing the recipe found in the search step to be presented.

The invention described in claim 12 is an information processing program that causes a computer to function as: a first acquisition means that acquires a first feeling degree specified by a user as a degree of strength of feelings for cooking; a second acquisition means that acquires a second feeling degree of each recipe on the basis of a plurality of attributes of the recipe, the second feeling degree being calculated as the degree of strength of feelings for cooking, the plurality of attributes being identified from the recipe stored in a storage means; a search means that searches for one or more recipes whose calculated second feeling degrees are within a range according to the first feeling degree; and a presentation means that causes the recipe found by the search means to be presented.

The invention described in claim 13 is a recording medium in which an information processing program is computer-readably recorded, the information generation program causing a computer to function as: a first acquisition means that acquires a first feeling degree specified by a user as a degree of strength of feelings for cooking; a second acquisition means that acquires a second feeling degree of each recipe on the basis of a plurality of attributes of the recipe, the second feeling degree being calculated as the degree of strength of feelings for cooking, the plurality of attributes being identified from the recipe stored in a storage means; a search means that searches for one or more recipes whose calculated second feeling degrees are within a range according to the first feeling degree; and a presentation means that causes the recipe found by the search means to be presented.

Advantageous Effects of Invention

According to the present invention, a recipe is presented in which the feeling degree within a range according to the feeling degree specified by the user is calculated. Therefore, it is possible to present a recipe according to a request reflecting how strongly the user feels for cooking.

BRIEF DESCRIPTION OF DRAWINGS

FIG. 2A is a diagram showing an example of a correspondence relationship between an attribute of a recipe and a feeling degree. FIG. 2B is a diagram showing a calculation example of the feeling degree.

FIG. 6A is a diagram showing an example of a correspondence relationship between a procedure conversion rule and a feeling degree. FIG. 6B is a diagram showing an example of a correspondence relationship between an ingredient conversion rule and a feeling degree.

FIG. 11A is a diagram showing an example of content registered in a recipe information DB 12a. FIG. 11B is a diagram showing an example of content included in ingredient information. FIG. 11C is a diagram showing an example of content included in procedure information. FIG. 11D is a diagram showing an example of content registered in a recipe conversion information DB 12b. FIG. 11E is a diagram showing an example of content registered in a recipe member information DB 12c. FIG. 11F is a diagram showing an example of content registered in an items—for-sale information DB 2a. FIG. 11G is a diagram showing an example of content registered in a member information DB 3a.

FIG. 12 is a flowchart showing a process example of a recipe registration process of a system control unit 14 of a recipe server 1 according to the embodiment.

FIG. 13 is a flowchart showing a process example of a recipe search process of the system control unit 14 of the recipe server 1 according to the embodiment.

FIG. 16A is a diagram showing an example of attributes of two recipes of which a user posted cooking reports. FIG. 16B is an example of a graph showing a relationship between a feeling degree and cooking, and relationship between a feeling degree and the number of procedures. FIG. 16C is a display example of a search result page.

FIG. 21A is a diagram showing a display example of a recipe page. FIG. 21B is a diagram showing a display example of a shopping cart page. FIG. 21C is a diagram showing a display example of a recipe page.

DESCRIPTION OF EMBODIMENTS

Hereinafter, embodiments of the present invention will be described in detail with reference to the drawings. The embodiments described below are embodiments where the present invention is applied to an information processing system.

1. First Embodiment

1-1. Schematic Configuration and Function of Information Processing System

Figure 1:
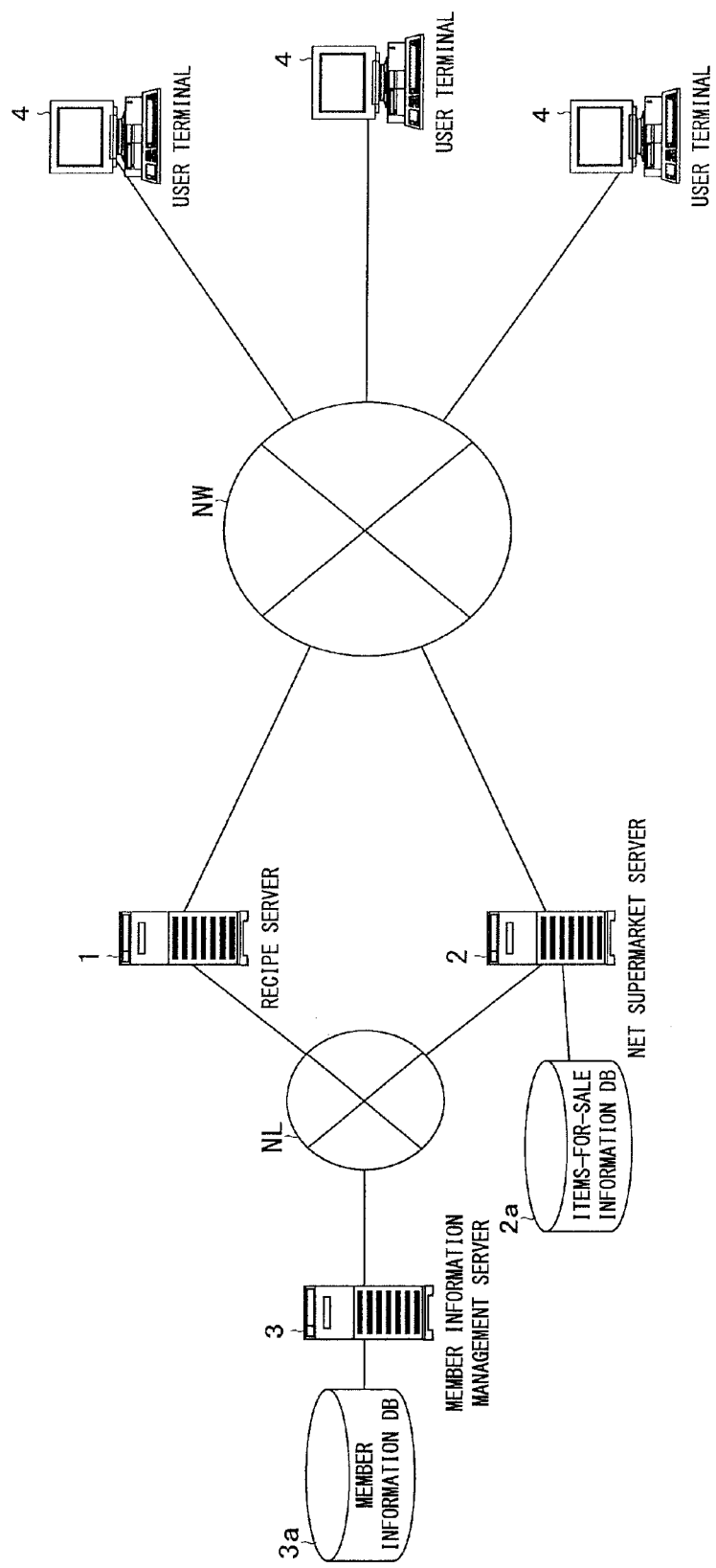
FIG. 1 is a diagram showing an example of a schematic configuration of an information processing system S according to an embodiment.

First, schematic configuration and function of an information processing system S according to the present embodiment will be described with reference to FIG. 1. FIG. 1 is a diagram showing an example of a schematic configuration of the information processing system S according to the present embodiment.

As shown in FIG. 1, the information processing system S includes a recipe server 1, a net supermarket server 2, a member information management server 3, and a plurality of user terminals 4. The recipe server 1, the net supermarket server 2, and each user terminal 4 can transmit and receive data to and from each other through a network NW by using, for example, TCP/IP as a communication protocol. The network NW includes, for example, the Internet, a dedicated communication line (for example, a CATV (Community Antenna Television) line), a mobile communication network (including a base station and the like), and a gateway. The recipe server 1, the net supermarket server 2, and the member information management server 3 can transmit and receive data to and from each other through a network NL. The network NL is, for example, a LAN (Local Area Network).

The recipe server 1, the net supermarket server 2, and the member information management server 3 are server devices that belong to a domain of a service providing site for providing Internet integrated services. The service providing site is a web site for providing various services to users through a network. When a user is registered as a member of the service providing site, the user can use services of various sites that belong to the service providing site.

The recipe server 1 is a server device that performs various processes related to a recipe site that belongs to the service providing site. The recipe site is a web site that receives a posting of a cooking recipe from a user and publishes the posted recipe on a web page. For example, according to a request from the user terminal 4, the recipe server 1 transmits a web page of the recipe site, performs a process to register a posted recipe, and performs a process to search for a recipe. The recipe server 1 may be configured so that even a user who is not registered in the service providing site can use the services of the recipe site. The recipe server 1 is an example of an information processing apparatus of the present invention.

The net supermarket server 2 is a server device that performs various processes related to a net supermarket that belongs to an integrated site. The net supermarket is, for example, a system that receives an order from a user through the network NW and delivers an ordered item for sale to user's home. In the net supermarket, a delivery date is defined according to the time when an order is made. If the time when the order is made is in a predetermined early time period in the day, a net supermarket company delivers the ordered item for sale within the day. For example, a user can buy ingredients of a dish to be cooked by a recipe browsed in the recipe site from the net supermarket. The net supermarket server 2 includes the items-for-sale information DB 2a. The "DB" is an abbreviation of database. In the items-for-sale information DB 2a, items-for-sale information related to the items for sale sold in the net supermarket is registered. For example, according to a request from the user terminal 4, the net supermarket server 2 transmits a web page of the net supermarket and performs processes related to a search and a purchase of an item for sale.

The member information management server 3 is a server device that manages information of users, who are registered in the integrated site as a member, as member information. The member information management server 3 includes the member information DB 3a. In the member information DB 3a, member information of each user is registered. Each of the recipe server 1 and the net supermarket server 2 accesses the member information DB 3a through the member information management server 3.

The user terminal 4 is a terminal device of a user who uses various web sites. On the basis of an operation from a user, the user terminal 4 accesses a server device such as the recipe server 1 and the net supermarket server 2. Thereby, the user terminal 4 receives a web page from the server device and displays the web page. In the user terminal 4, software such as a browser and an email client is installed. For example, a personal computer, a PDA (Personal Digital Assistant), a mobile information terminal such as a smartphone, and a mobile phone are used as the user terminal 4.

1-2 Feeling Degree

Next, search and display of a recipe based on a feeling degree will be described with reference to FIGS. 2 to 5.

A user can search for a desired recipe by specifying a search condition in the recipe site. As the search condition, for example, there are a keyword, a category of the recipe, and names of ingredients. In the recipe site, it is possible to specify a feeling degree. The feeling degree is, for example, information indicating how much the user pursues quality of a dish to be made. The feeling degree may also be called a quality pursuit degree. The feeling degree is, for example, a value according to time and effort to cook. Specifically, when a user wants to make a good dish even if the user spends time and effort, the feeling degree is high. On the other hand, when a user wants to make a dish simply without spending time and effort, the feeling degree is low. Further, in addition to the time and effort, the feeling degree may be a value according to a degree of quality of ingredients used for the dish. Specifically, when a user wants to make a good dish by willing to use high quality ingredients, the feeling degree is high. On the other hand, when a user wants to make a dish by using inexpensive ingredients, the feeling degree is low. A user can search for a recipe according to the strength of the use's feeling by specifying the feeling degree. The feeling degree specified by the user is an example of a first feeling degree of the present invention.

The recipe server 1 calculates the feeling degree of each recipe in order to make it possible to search for a recipe by using the feeling degree. The feeling degree of recipe is an example of a second feeling degree of the present invention. The feeling degree of recipe is calculated based on a plurality of attributes that the recipe has. The recipe server 1 manages recipe information that represents content of the recipe. Therefore, the recipe server 1 identifies attributes of the recipe on the basis of the recipe information. The recipe information includes attributes of the recipe. Therefore, the recipe server 1 can identify the attributes used to calculate the feeling degree from the recipe information. The attributes used to calculate the feeling degree are not limited to the attributes included in the recipe information. The attributes used to calculate the feeling degree may be attributes that can be identified based on the content of the recipe information.

The attributes used to calculate the feeling degree are roughly classified into attributes that affect the time and effort to cook and the degree of quality of ingredients. The attributes that affect the time and effort includes, for example, the number of ingredients, the number of procedures, and a cooking time. The recipe server 1 calculates the feeling degree of each attribute on the basis of each attribute and sums up the calculated feeling degrees, so that the recipe server 1 calculates the feeling degree of the recipe.

FIG. 2A is a diagram showing an example of a correspondence relationship between the attributes of the recipe and the feeling degrees. The number of ingredients is the number of ingredients used to cook a dish. The greater the number of ingredients is, the greater the time and effort required to cook the dish tends to be. Therefore, the greater the number of ingredients is, the higher the feeling degree is. For example, as shown in FIG. 2A, normally, one point is added to the feeling degree per one ingredient. In other words, the feeling degree corresponding to the number of ingredients is equal to the number of ingredients. However, there are ingredients that do not require so much time and effort for the user to use. Therefore, there is a case in which a feeling degree smaller than 1 is added depending on the ingredient. For example, a seasoning is 0.1 point. Further, boiled rice is 0.3 point. Further, water is 0 point.

The number of procedures is the number of cooking procedures. The greater the number of procedures is, the greater the time and effort required to cook the dish tends to be. Therefore, the greater the number of procedures is, the higher the feeling degree is. For example, the feeling degree corresponding to the number of procedures is equal to the number of procedures×3.

The greater the cooking time is, the greater the time and effort required to cook the dish tends to be. Therefore, the greater the cooking time is, the higher the feeling degree is. For example, 1 point is added every 15 minutes. In other words, the feeling degree corresponding to the cooking time is equal to the cooking time/15.

The degree of quality of ingredients is, for example, a cost of ingredients required to make a dish for one person. The higher the cost of ingredients is, the higher the degree of quality of the ingredients is. Therefore, the higher the cost of ingredients is, the higher the feeling degree is. For example, 1 point is added for every 500 yen. In other words, the feeling degree corresponding to the cost of ingredients is equal to the cost of ingredients/500. The degree of quality may be determined for each ingredient in advance. Then, the sum of the degrees of quality of all the ingredients used in the recipe may be the feeling degree corresponding to the degree of quality. For example, the degree of quality of a normal ingredient is assumed to be 0 point. The higher the quality of an ingredient is, the higher the degree of quality is. For example, it is determined that the degree of quality of shrimp, beef, and the like is 3 points, the degree of quality of white asparagus, raw ham, and the like is 6 points, and the degree of quality of shark fin, abalone, and the like is 9 points.

FIG. 2B is a diagram showing a calculation example of the feeling degree of a recipe with a recipe title of "cooked taro". As shown in FIG. 2B, as the ingredients, there are taro, salt, sugar, sweet cooking rice wine, soy sauce, and granular soup. Each of the taro and the granular soup is 1 point. Each of the salt, the sugar, the sweet cooking rice wine, and the soy sauce is 4-0.1 point. Therefore, the feeling degree corresponding to the number of ingredients is 2.4 points. Further, the number of procedures is 5, the cooking time is 30 minutes, and the degree of quality of ingredients is 200 yen. Therefore, the feeling degrees of these are 15 points, 2 points, and 1 point. Therefore, the feeling degree of the "cooked taro" is 20.4 points.

The attributes used to calculate the feeling degree are not limited to the attributes described above. For example, a degree of difficulty of cooking may be included in the recipe information. Then, the recipe server 1 may use the degree of difficulty of cooking to calculate the feeling degree. The higher the degree of difficulty of cooking is, the higher the feeling degree is. The time and effort to cook is not limited to the time and effort to only cook a dish. The time and effort to cook may include the time and effort required to prepare the cooking. As the time and effort required to prepare the cooking, there is procurement of ingredients. Therefore, the recipe server 1 may use the degree of difficulty of procurement of ingredients to calculate the feeling degree. The higher the degree of difficulty of procurement of ingredients is, the more the time and effort are required to procure the ingredients. Therefore, the higher the degree of difficulty of procurement of ingredients is, the higher the feeling degree is.

The recipe server 1 may use at least two attributes when calculating the feeling degree of a recipe. An administrator of the recipe site can arbitrarily determine a combination of the attributes used to calculate the feeling degree.

Figure 3A:
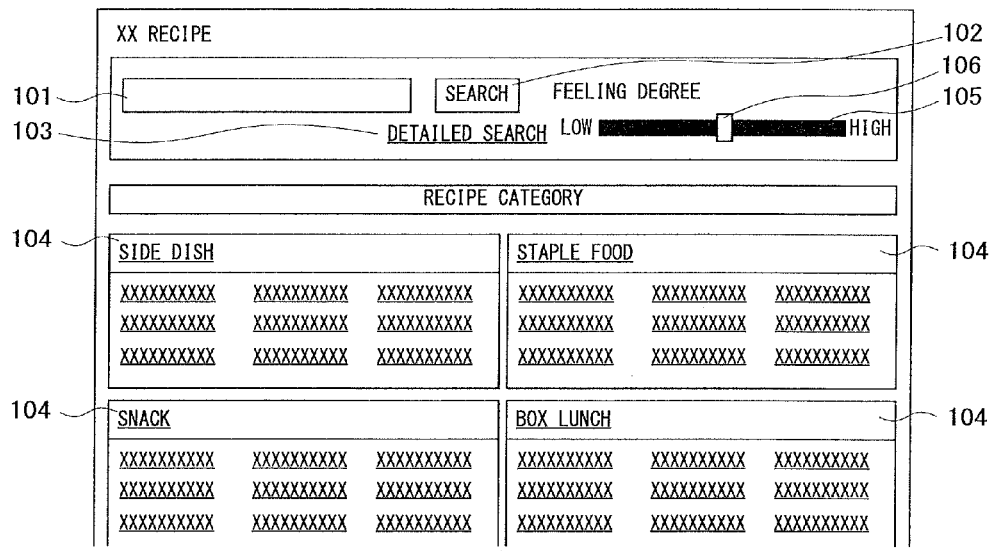
FIG. 3A is a diagram showing a display example of a top page of a recipe site.

Next, a method for a user to specify the feeling degree will be described. FIG. 3A is a diagram showing a display example of the top page of the recipe site. As shown in FIG. 3, on the top page, a keyword input area 101, a search button 102, a detailed search link 103, a plurality of category specification areas 104, and a slide bar 105 are displayed. The keyword input area 101 is an input area for inputting a keyword as a search condition. The search button 102 is a button to request the recipe server 1 to perform search. The detailed search link 103 is a link for displaying a detailed search page. The detailed search page is a web page for specifying a detailed search condition. An example of the detailed search condition is an ingredient name. Each category specification area 104 includes a plurality of links to specify a category as a search condition.

The slide bar 105 is a widget for specifying the feeling degree. The slide bar 105 includes a tab 106. A user can slide the tab 106 to right and left by operating the tab 106. The position of the tab 106 on the slide bar 105 corresponds to the feeling degree. In other words, the tab 106 indicates the feeling degree at the current time point. The tab 106 is an example of a pointer of the present invention. When the user selects the search button 102, a recipe according to the feeling degree corresponding to the position of the tab 106 is searched for. When the user inputs a keyword in the keyword input area 101 and selects the search button 102, a recipe according to the feeling degree corresponding to the position of the tab 106 is searched for from among recipes corresponding to the inputted keyword. When the user selects a link in any one of the category specification areas 104, a recipe according to the feeling degree corresponding to the position of the tab 106 is searched for from among recipes that belong to a category corresponding to the selected link. The slide bar 105 is also displayed in the detailed search page. When the user selects the ingredient name on the detailed search page, a recipe according to the feeling degree corresponding to the position of the tab 106 is searched for from among recipes that use an ingredient indicated by the ingredient name.

The slide bar 105 is a widget for specifying the feeling degree. The slide bar is an example of a widget of the present invention. There is a probability that the user is not aware of the feeling degree as a specific value. Therefore, it is possible to specify the feeling degree by the position of the tab 106. The widget for specifying the feeling degree is not limited to the slide bar 105. For example, the widget may be a dial that can be rotatably operated.

Figure 3B:
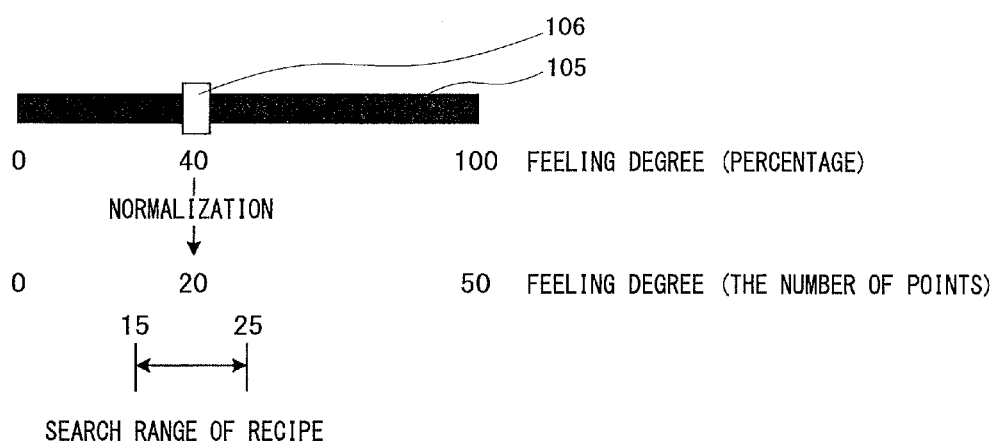
FIG. 3B is a diagram showing an example of a recipe search method using the feeling degree.

Next, a method for searching for a recipe by using the feeling degree and display of a search result will be described. FIG. 3B is a diagram showing an example of the method for searching for a recipe by using the feeling degree. The feeling degree corresponding to the position of the tag 106 is represented by, for example, percentage. For example, as shown in FIG. 3B, the left end of the slide bar 105 represents 0 percent and the right end represents 100 percent. The recipe server 1 normalizes the feeling degree corresponding to the position of the tag 106 into the number of points. For example, 0 percent indicates 0 point and 100% indicates the maximum value of the number of points. For example, it is assumed that the maximum value of the number of points is 50 points. When the feeling degree corresponding to the position of the tag 106 is 40%, the feeling degree is converted into 20 points. The recipe server 1 sets a range according to the feeling degree specified by the user and searches for recipes whose feeling degree is within the set range. For example, a range within ±5% of the specified feeling degree is determined to be a search range. When the specified feeling degree is 20 points, the search range is greater than or equal to 17.25 points and smaller than or equal to 22.5 points. The search range is not limited to ±5% of the specified feeling degree. The search range may be a range according to the specified feeling degree.

Figure 4A:
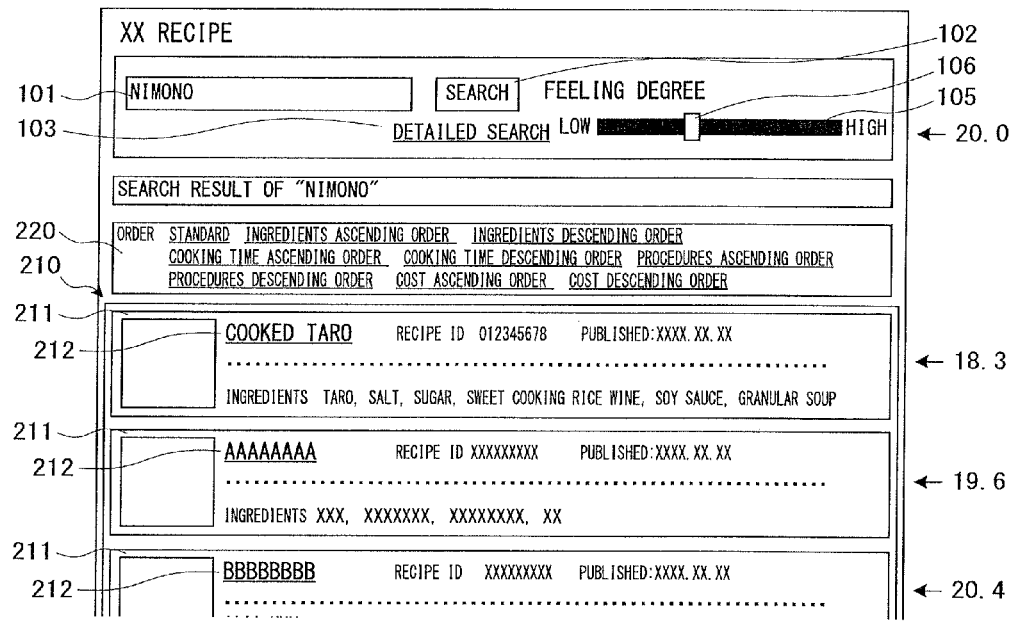
FIGS. 4A and 4B are diagrams showing display examples of a search result page.

FIG. 4A is a diagram showing a display example of a search result page. In FIG. 4A, the same components as those in FIG. 3A are denoted by the same reference numerals. When the recipe server 1 searches for recipes, the recipe server 1 transmits a search result page to the user terminal 4. The search result page is a web page on which the search result of recipes is displayed. As shown in FIG. 4A, on the search result page, a keyword input area 101, a search button 102, a detailed search link 103, a slide bar 105, a list display area 210, a sort condition specification area 220 are displayed. The user can specify the search condition again and transmit a search request by operating the keyword input area 101, the search button 102, the detailed search link 103, and the slide bar 105.

In the list display area 210, a list of found recipes is displayed. Specifically, in the list display area 210, a found recipe display area 211 is displayed for each found recipe. In the found recipe display area 211, brief information of the found recipe is displayed. For example, in the found recipe display area 211, a recipe title link 212, a recipe ID, the published date of the recipe, a comment from a person who posted the recipe, ingredient names, an image of the dish are displayed. The recipe title link 212 represents the recipe title. The recipe title link 212 is a link to display a recipe page. The recipe page is a web page on which the recipe is displayed. Specifically, the recipe information is displayed. The recipe ID is identification information of the recipe.

In the found recipe display area 211, for example, recipes are displayed in ascending order of the feeling degree. FIG. 4A shows the feeling degree of a corresponding recipe at the right of each found recipe display area 211 as reference. FIG. 4A is a display example in which the user specifies "nimono" as a keyword and specifies the feeling degree of 20 points. The nimono is boiled and seasoned food.

In the list display area 210, the found recipe display areas 211 of recipes of 18.3 points, 19.6 points, and 20.4 points are displayed. The recipe of 18.3 points is "cooked taro".

The sort condition specification area 220 includes a plurality of links to specify a condition of the arrangement order of the recipes listed in the list display area 210. When the user selects any one of the links in the sort condition specification area 220, the recipe server 1 rearranges the found recipes by a sort condition corresponding to the selected link. Then, the recipe server 1 transmits a new search result page in which the rearrangement is reflected on the list display area 210 to the user terminal 4.

Figure 4B:
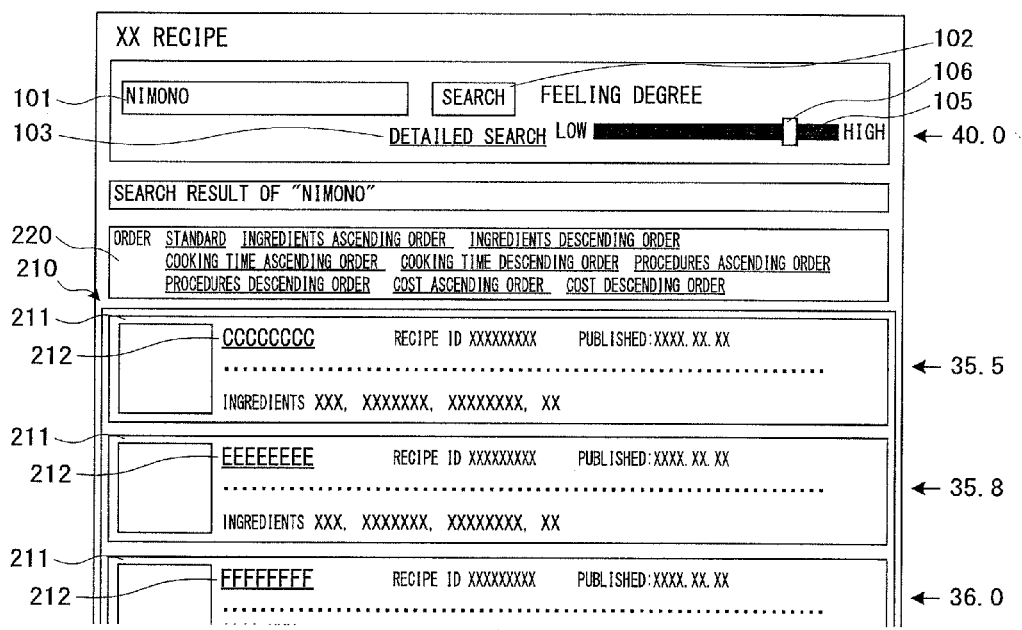

FIG. 4B is a display example in which the user specifies "nimono" as a keyword and specifies the feeling degree of 40 points. As shown in FIG. 4B, in the list display area 210, the found recipe display areas 211 of recipes of 35.5 points, 35.8 points, and 36.6 points are displayed. In this way, even if the search condition other than the feeling degree is the same, when the user changes the feeling degree, different recipes are searched for and found. In other words, the user can search for recipes according to a feeling of the user at that time by specifying the feeling degree. For example, if the user wants to make a nimono but does not want to spend time and effort or does not want to spend much money, the user lowers the feeling degree by using the slide bar 105. On the other hand, if the user wants to make a nimono and thinks that the user can afford to spend time and effort or can afford to spend much money, the user raises the feeling degree by using the slide bar 105.

The position of the tab 106 of the slide bar 105 on the search result page is the same as the position of the tab 106 when the user operates the slide bar 105 on the top page. In other words, the position of the tab 106 on the search result page indicates the feeling degree specified by the user. When the user moves the tab 106 to change the feeling degree on the search result page, a list of recipes according to the changed feeling degree is displayed in the list display area 210. At this time, the search condition other than the feeling degree is maintained. At this time, the user need not operate the search button 102. For example, on the search result page shown in FIG. 4A, when the user moves the tab 106 from the position of 20 points to the position of 40 points, the search result page as shown in FIG. 4B is displayed. The user specifies the feeling degree by the slide bar 105, so that the recipe according to the specified feeling degree may not be a recipe desired by the user. The user can change the feeling degree while checking the search result by operating the slide bar 105. Therefore, it is possible to make it easy for the user to search for a desired recipe.

Figure 5:
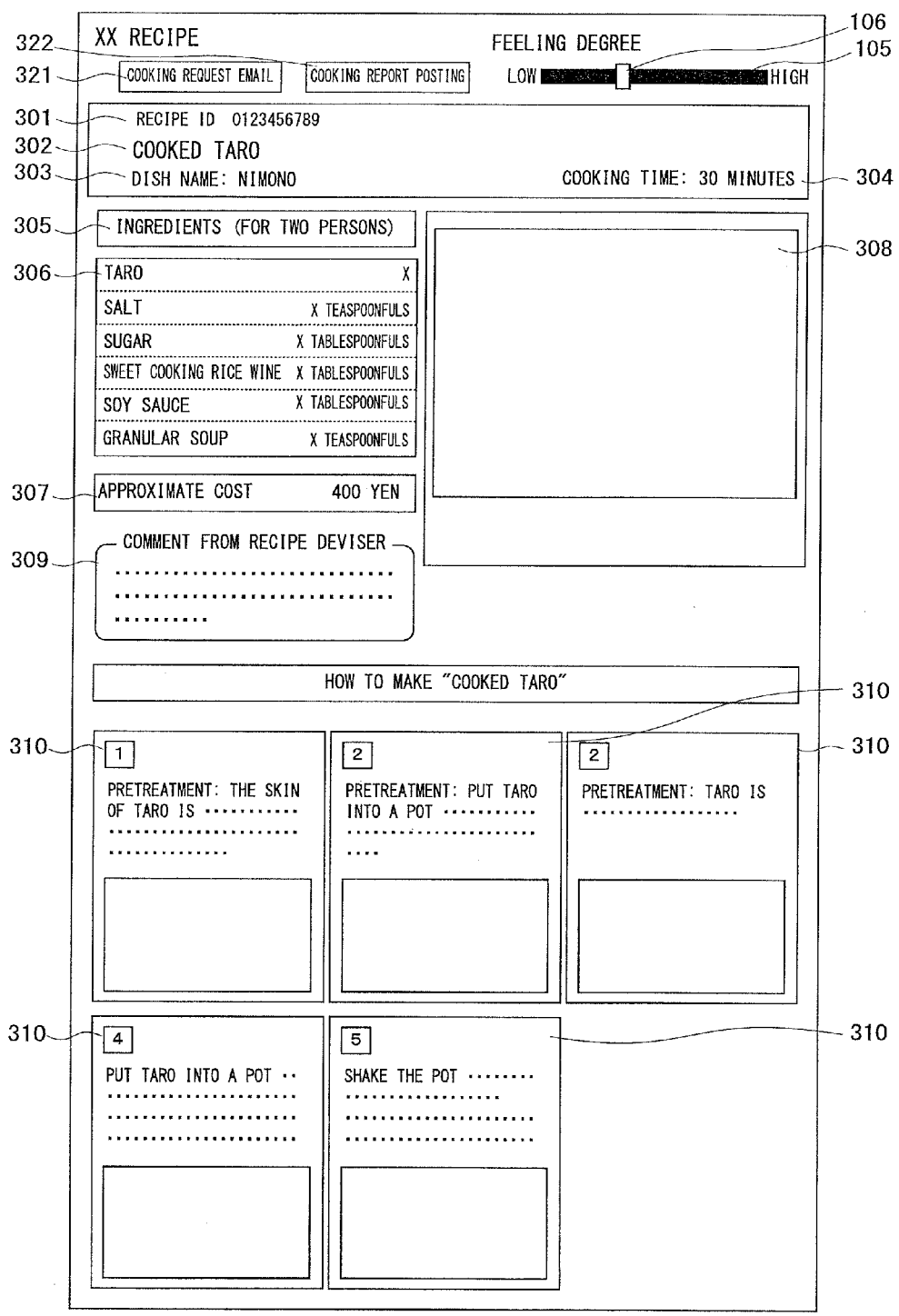
FIG. 5 is a diagram showing a display example of a recipe page.

FIG. 5 is a diagram showing a display example of the recipe page. As shown in FIG. 5, in the recipe page, a slide bar 105, a recipe ID 301, a recipe title 302, a dish name 303, a cooking time 304, the number of target people 305, an ingredient display field 306, an ingredient cost 307, a dish image 308, a comment 309, procedure display fields 310, a cooking request email creation button 321, and a cooking report posting button 322 are displayed. How to use the slide bar 105 on the recipe page will be described later.

The number of target people 305 indicates food for how many people can be made by the amount of ingredients displayed in the ingredient display field 306. In the ingredient display field 306, a list of the ingredients is displayed. Specifically, in the ingredient display field 306, the ingredient name and the amount of the ingredient are displayed for each ingredient. One or more procedure display fields 310 are displayed. In the procedure display field 310, the procedure of the cooking is displayed. Specifically, in the procedure display field 310, a procedure text and a procedure image are displayed. The procedure text is a text that describes the procedure. The procedure image is an image that shows the procedure. The number of displayed procedure display fields 310 corresponds to the number of the procedures.

The cooking request email creation button 321 is a button for creating a cooking request email. The cooking request email is an email in which for the user requesting another person to cook a dish by the recipe displayed on the recipe page. When the user selects the cooking request email creation button 321, a window for creating a cooking request email is displayed. In this window, when the user inputs a destination address of email an email and a comment, the recipe server 1 creates and transmits the cooking request email. In the cooking request email, an URL (Uniform Resource Locator) of the recipe page, the comment, the ingredient names and the amount of the ingredients used by the recipe, the procedure text, and the like are described.

The cooking report posting button 322 is a button for posting a cooking report. The cooking report is a report including results and feedback of the cooking performed by the user by using the recipe displayed on the recipe page. When the user selects the cooking report posting button 322, a window for creating a cooking report is displayed. In this window, when the user inputs a cooking report, the recipe server 1 registers the inputted cooking report. For example, the registered cooking report is displayed on a corresponding recipe page.

1-3. Conversion of Recipe

Next, a conversion of a recipe will be described with reference to FIGS. 6 to 9.

There is a case in which a recipe according to the feeling degree specified by the user is not registered or recipes according to the feeling degree specified by the user are few. Therefore, by converting a recipe posted from a user, the recipe server 1 is configured to be able to present a recipe according to the feeling degree specified by a user.

For example, even the same dish may require different time and effort if the cooking method is different. Further, even when cooking the same dish, the user can use inexpensive ingredients or expensive ingredients. The recipe server 1 converts procedures and/or ingredients into other procedures and/or ingredients so that the attributes used to calculate the feeling degree are changed. Thereby, the recipe server 1 generates a recipe whose feeling degree is different from that of the recipe before being converted. The recipe server 1 converts at least one of procedures and ingredients so that a completed dish will be the same or substantially the same before and after the conversion. Therefore, the procedure or the ingredient after the conversion is replaceable from the procedure or the ingredient before the conversion when making the dish made with the recipe before the conversion (or when making substantially the same dish as that made with the recipe before the conversion).

FIG. 6A is a diagram showing an example of a correspondence relationship between a procedure conversion rule and the feeling degree. For example, as shown in FIG. 6A, in the procedure conversion rule, the procedure before the conversion and the procedure after the conversion are defined. For example, when soup stock is required, it is assumed that the procedure to use granular soup is converted into a procedure to make soup stock from kelp and dried bonito. In this case, actually, the procedure to make the soup stock is added. Further, the ingredient is changed. Therefore, the feeling degree is increased by, for example, 2 points. Conversely, it is assumed that the procedure to make soup stock from kelp and dried bonito is converted into the procedure to use granular soup. In this case, the feeling degree is decreased by, for example, 2 points. Further, for example, when pretreated taro is required, it is assumed that a procedure to procure pretreated taro and use the pretreated taro without change is converted into a procedure to pretreat taro. In this case, actually, the procedure to pretreat taro is added. Therefore, the feeling degree is increased by, for example, 3 points. Conversely, it is assumed that the procedure to pretreat taro is converted into the procedure to procure pretreated taro and use the pretreated taro without pretreating it. In this case, the feeling degree is decreased by, for example, 3 points.

FIG. 6B is a diagram showing an example of a correspondence relationship between an ingredient conversion rule and the feeling degree. For example, as shown in FIG. 6B, in the ingredient conversion rule, the ingredient before the conversion and the ingredient after the conversion are defined. For example, it is assumed that normal kelp is converted into expensive kelp made in VV area. In this case, the feeling degree is increased by, for example, 1 point. Conversely, it is assumed that normal kelp is converted into inexpensive kelp made in WW area. In this case, the feeling degree is decreased by, for example, 1 point.

For example, the procedure conversion rule and the ingredient conversion rule are registered in advance. The recipe server 1 registers a recipe posted from a user as an original recipe. Further, the recipe server 1 generates a new recipe by converting the original recipe by using the conversion rule. The recipe generated by conversion is referred to as a conversion copy with respect to the original recipe. The recipe server 1 also registers the generated conversion copy.

For example, the original recipe "cooked taro" is a recipe which uses granular soup. Therefore, the recipe server 1 generates a conversion copy in which the procedure to use granular soup is converted into the procedure to make soup stock from kelp and dried bonito. The feeling degree of the conversion copy is 22.4 points. It is assumed that the original recipe "cooked taro" is a recipe which includes the procedure to pretreat the taro. Therefore, the recipe server 1 generates a conversion copy in which the procedure to pretreat the taro is converted into the procedure to use pretreated taro. The feeling degree of the conversion copy is 17.4 points. Any of the conversion copies is "cooked taro". The number of conversion copies generated from one original recipe is not limited. The recipe server 1 may use a plurality of conversion rules when generating one conversion copy.

When the recipe server 1 searches for a recipe, the recipe server 1 preferentially searches for (displays) an original recipe. The reason of this is because it is preferable that the content posted by the user is respected. However, when the number of original recipes that can be found is smaller than or equal to a predetermined number, the recipe server 1 searches for original recipes and conversion copies.

Figure 7:
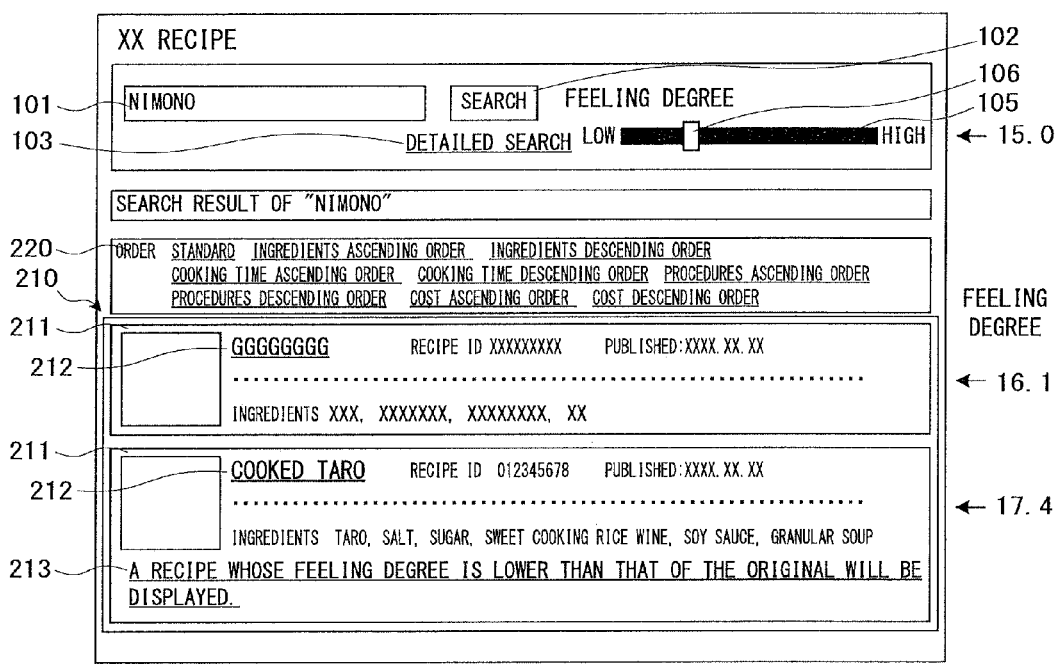
FIG. 7 is a diagram showing a display example of a search result page in which a search result includes a recipe conversion copy.

FIG. 7 is a diagram showing a display example of the search result page in which the search result includes a recipe conversion copy. FIG. 7 is a display example in which the user specifies "nimono" as a keyword and specifies the feeling degree of 15 points. In the list display area 210, the found recipe display area 211 of "cooked taro" whose feeling degree is 17.4 points is displayed. In the found recipe display area 211 of the conversion copy, a conversion message 213 is displayed. The conversion message 213 is a message that indicates the recipe is a converted recipe. In a case of a recipe whose feeling degree is lower than that of the original recipe, for example, "a recipe whose feeling degree is lower than that of the original will be displayed" is displayed. On the other hand, in a case of a recipe whose feeling degree is higher than that of the original recipe, for example, "a recipe whose feeling degree is higher than that of the original will be displayed" is displayed.

Figure 8:
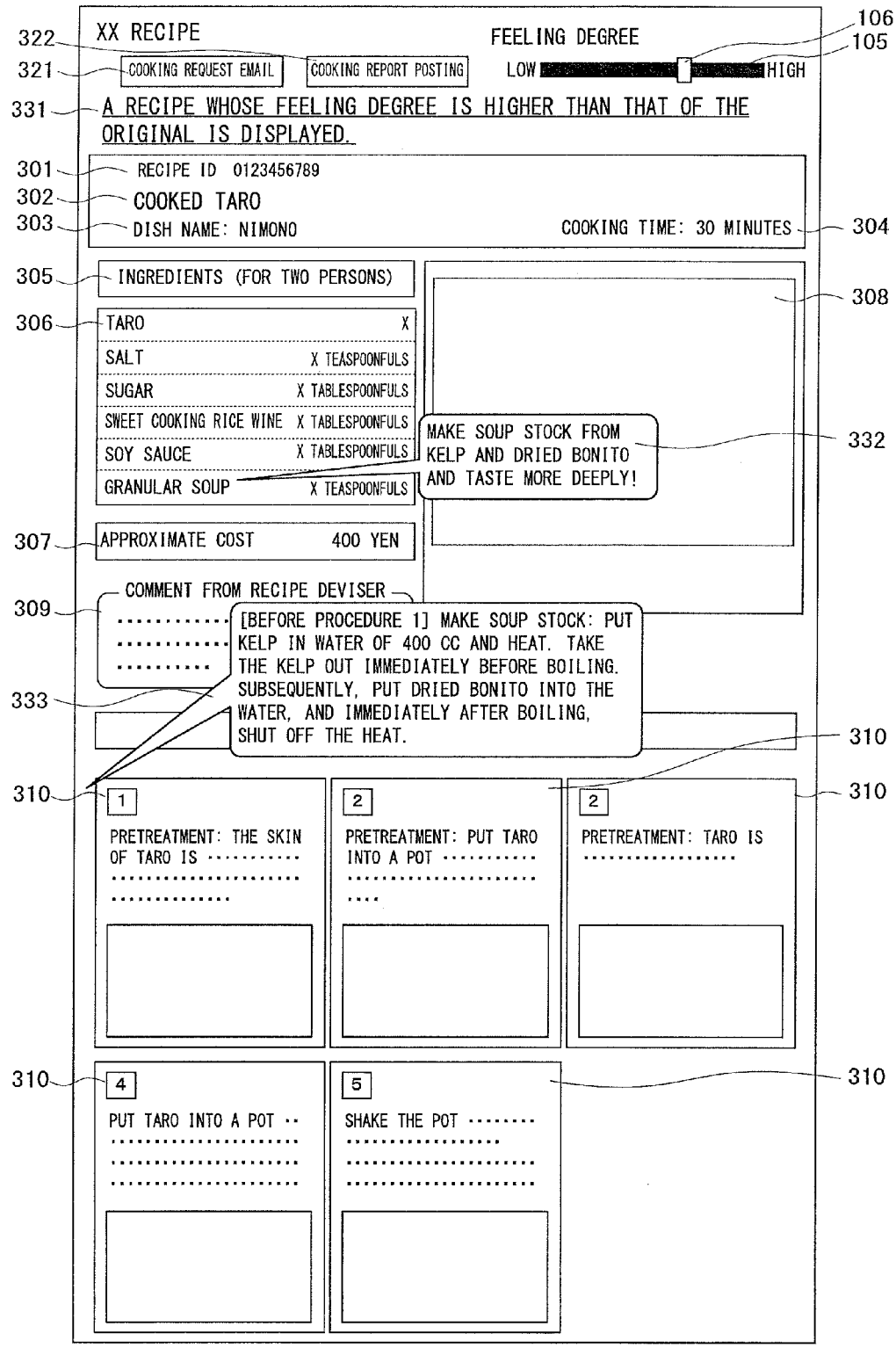
FIG. 8 is a diagram showing a display example of a recipe page of a recipe conversion copy.
Figure 9:
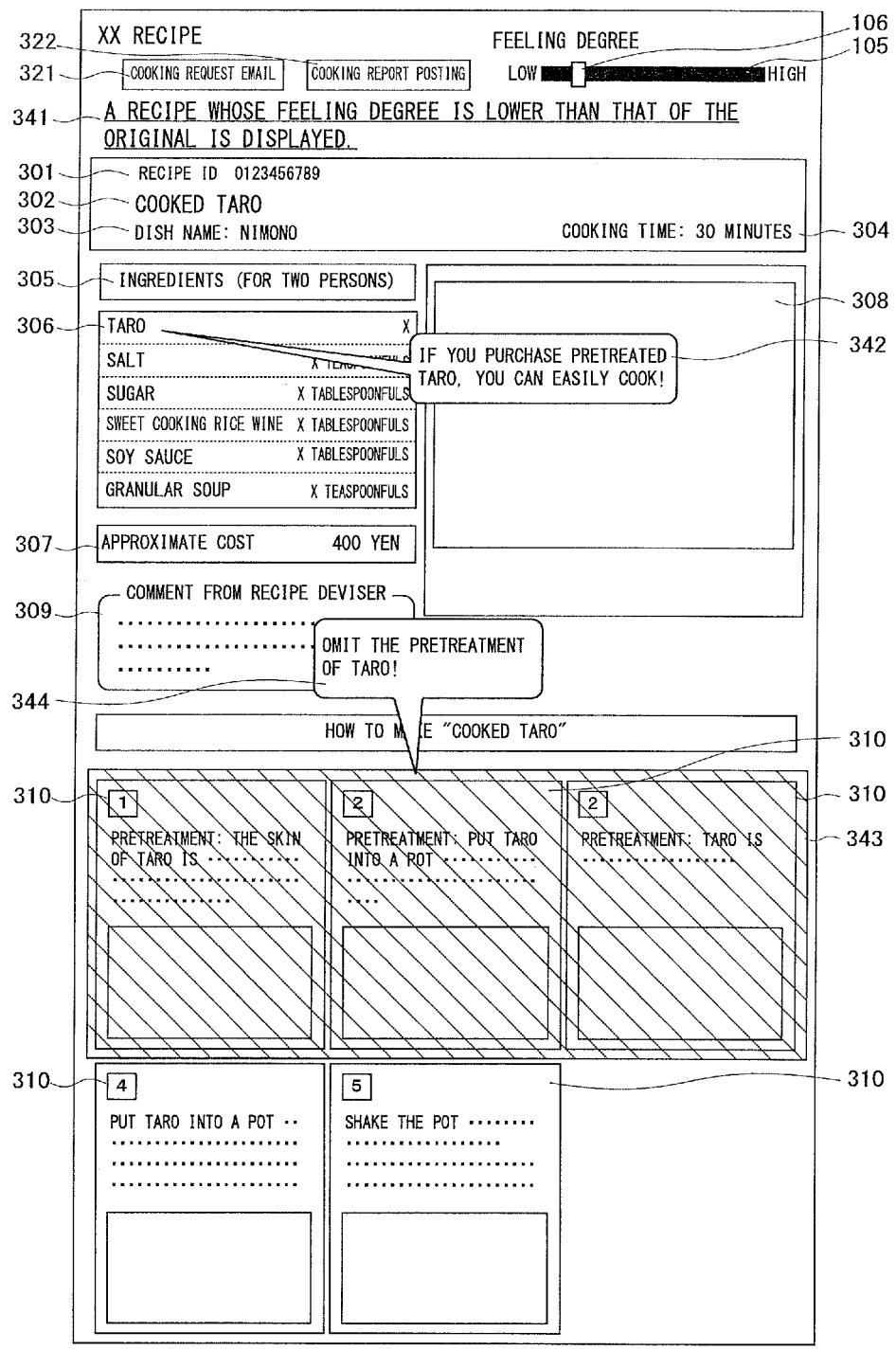
FIG. 9 is a diagram showing a display example of a recipe page of a recipe conversion copy.

FIGS. 8 and 9 are diagrams showing a display example of a recipe page of a recipe conversion copy. FIG. 8 shows a recipe page of a conversion copy of "cooked taro" whose feeling degree is 22.4. As shown in FIG. 8, in the recipe page, a conversion message 331 and balloons 332 and 333 are displayed in addition to the display content of the recipe page shown in FIG. 5. As the conversion message 331, for example, "a recipe whose feeling degree is higher than that of the original is displayed" is displayed. The balloon 332 indicates the "granular soup" displayed in the ingredient display field 306 as an ingredient before conversion. In the balloon 332, as information related to an ingredient after conversion, for example, a text such as "Make soup stock from kelp and dried bonito and taste more deeply!" is displayed. In the balloon 333, as an added procedure, for example, a text such as "[Before Procedure 1] Make soup stock: Put kelp in water of 400 cc and heat. Take the kelp out immediately before boiling. Subsequently, put dried bonito into the water, and immediately after boiling, shut off the heat." is displayed. The balloon 333 indicates a position where the procedure display field 310 of the added procedure should be displayed. The user can change the position of the balloon while maintaining the position which the balloon indicates by operating the balloon.

In the recipe page, the recipe server 1 does not directly change the ingredient name displayed in the ingredient display field 306 and does not directly add the procedure display field 310. The reason of this is because the recipe server 1 should not change the content of the original recipe without obtaining permission from the posting person. When the display is as shown in FIG. 8, the user can check the content of the original recipe and can also check the changes from the original recipe. The content of the conversion copy is not limited to the recipe in which the content of the original recipe is changed. The content of the conversion copy may be a recipe generated by adding content, which is generated by converting a part of the content of the original recipe, to the original recipe.

FIG. 9 shows a recipe page of a conversion copy of "cooked taro" whose feeling degree is 17.4. As shown in FIG. 9, in the recipe page, a conversion message 341, a balloon 342, a deletion frame 343, and a balloon 344 are displayed in addition to the display content of the recipe page shown in FIG. 5. As the conversion message 341, for example, "a recipe whose feeling degree is lower than that of the original is displayed" is displayed. The balloon 342 indicates the "taro" displayed in the ingredient display field 306 as an ingredient before conversion. In the balloon 332, as information related to an ingredient after conversion, for example, a text such as "If you purchase pretreated taro, you can easily cook!" is displayed. The deletion frame 343 covers the procedure display fields 310 of the procedures 1 to 3 showing procedures of pretreatment of the taro. Thereby, contents of the procedure display fields 310 of the procedures 1 to 3 are weakly displayed. The balloon 344 indicates the deletion frame 343. In the balloon 344, for example, a text such as "Omit the pretreatment of taro!" is displayed.

The position of the tab 106 of the slide bar 105 on the recipe page indicates the feeling degree specified by the user. When the user moves the tab 106 to change the feeling degree, a recipe according to the changed feeling degree is displayed on the recipe page. The recipe displayed before the change of the feeling degree and the recipe displayed after the change of the feeling degree are in a relationship between the original and a conversion copy or in a relationship between two conversion copies made from the same original. For example, when the user moves the tab 106 rightward on the recipe page shown in FIG. 5, the recipe page shown in FIG. 8 is displayed. Further, when the user moves the tab 106 leftward on the recipe page shown in FIG. 5, the recipe page shown in FIG. 9 is displayed. The user can cause a recipe according to the feeling degree intended by the user to be displayed by operating the slide bar 105 on the recipe page.

1-4. Configuration of Each Server Device

Next, a configuration of each server device will be described with reference to FIGS. 10 and 11.

1-4-1. Configuration of Recipe Server

Figure 10:
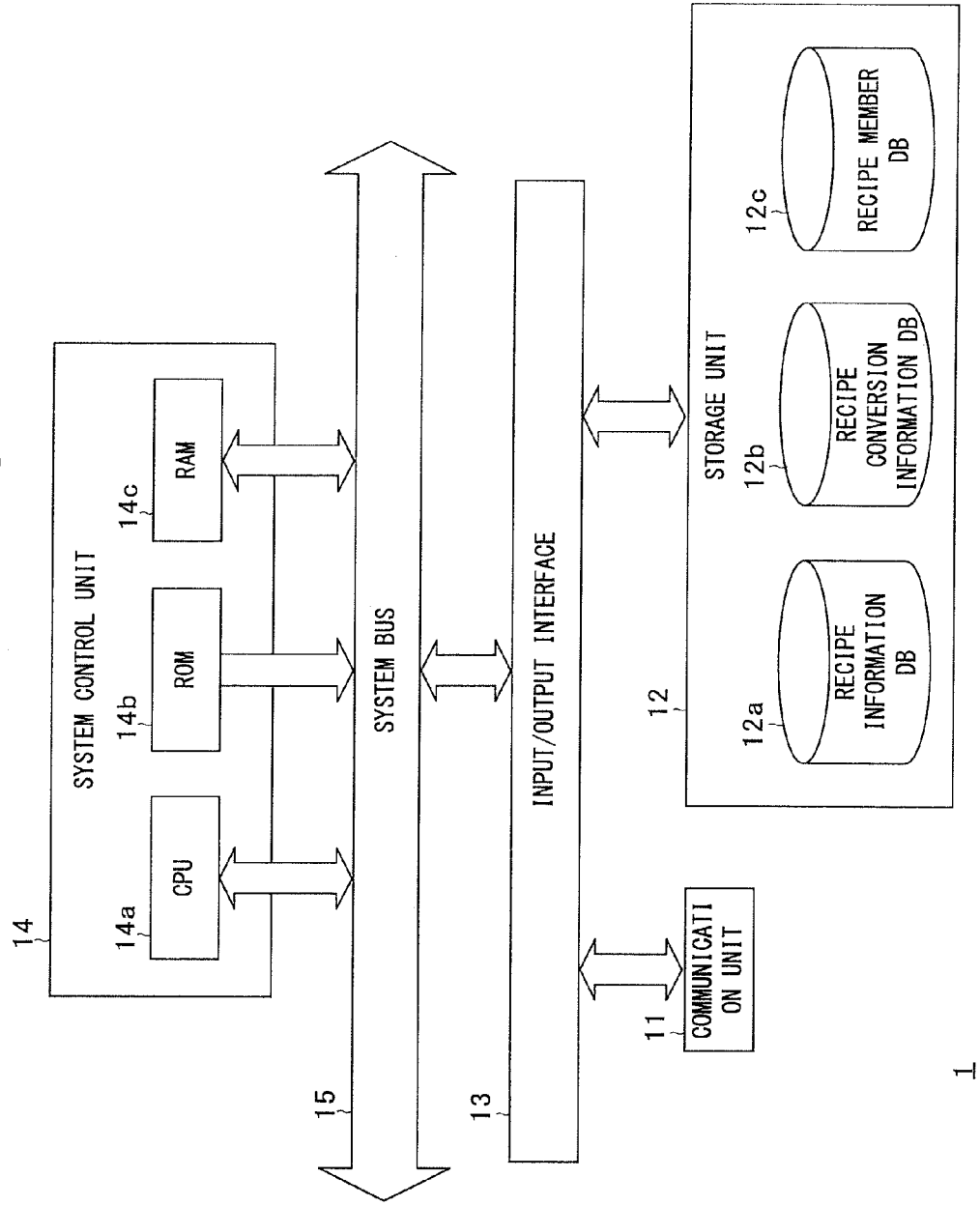
FIG. 10 is a block diagram showing an example of a schematic configuration of a recipe server 1 according to the embodiment.

FIG. 10 is a block diagram showing an example of a schematic configuration of the recipe server 1 according to the present embodiment. As shown in FIG. 10, the recipe server 1 includes a communication unit 11, a storage unit 12, an input/output interface 13, and a system control unit 14. The system control unit 14 and the input/output interface 13 are connected through a system bus 15.

The communication unit 11 connects to the networks NW and NL and controls communication state with the other servers, the user terminals 4, and the like.

The storage unit 12 includes, for example, a hard disk drive and the like. The storage unit 12 is an example of a storage means and a history storage means of the present invention. In the storage unit 12, databases such as a recipe information DB 12a, a recipe conversion information DB 12b, and a recipe member DB 12c are constructed.

FIG. 11A is a diagram showing an example of content registered in the recipe information DB 12a. In the recipe information DB 12a, recipe information is registered. Specifically, in the recipe information DB 12a, a recipe ID, a recipe type, a copy number, a published date and time, a user ID, a category ID, a recipe title, a dish name, a cooking time, a dish image, ingredient information, a comment, procedure information, and a feeling degree are registered for each recipe. Information corresponding to the recipe is the recipe title, the dish name, the dish image, the ingredient information, and the procedure information. The recipe type indicates whether the recipe is an original or a conversion copy. The copy number is an identification number of the conversion copy. The copy number is set when the recipe is a conversion copy. The original recipe and a conversion copy have the same recipe ID. The recipe server 1 can identify each recipe by a combination of the recipe ID, the recipe type, and the copy number. The user ID is identification information of a user who posted the recipe. The category ID is identification information of a category to which the recipe belongs.

FIG. 11B is a diagram showing an example of content included in the ingredient information. In the ingredient information, the number of target people and the ingredient cost are included and the ingredient name and the amount of ingredient are included for each ingredient. The system control unit 14 can identify the number of ingredients from the ingredient information. FIG. 11C is a diagram showing an example of content included in the procedure information. In the procedure information, a procedure text and a procedure image are registered for each procedure. The system control unit 14 can identify the number of procedures from the procedure information.

FIG. 11D is a diagram showing an example of content registered in the recipe conversion information DB 12b. In the recipe conversion information DB 12b, recipe conversion information used to convert a recipe is registered. Specifically, in the recipe conversion information DB 12b, a conversion ID, conversion rule information, and a feeling degree are registered in association with each conversion rule. The conversion ID is identification information of the recipe conversion information. The conversion rule information indicates the conversion rule. For example, in the conversion rule information, a type of attribute of an object to be converted, a keyword to search for the attribute of the object to be converted, a conversion method, content of the attribute after conversion, a text to be displayed in a balloon, and the like are set. The feeling degree is the number of points added to the feeling degree of the original recipe.

The content of the conversion rule information will be specifically described by using an example in which the procedure to use granular soup is converted into the procedure to make soup stock from kelp and dried bonito. The types of the object to be converted are the ingredient and the procedure. The keywords are "granular" and "soup". When a plurality of keywords is set, an attribute that includes all the keywords is an object to be converted. The conversion method of the ingredient is a change. The name of the ingredient before conversion is "granular soup". The text displayed in the balloon corresponding to the ingredient is "Make soup stock from kelp and dried bonito and taste more deeply!" The conversion method of the procedure is an addition. The text displayed in the balloon corresponding to the (added) procedure text and the procedure after conversion (after addition) is "Make soup stock: Put kelp in water of 400 cc and heat. Take the kelp out immediately before boiling. Subsequently, put dried bonito into the water, and immediately after boiling, shut off the heat."

FIG. 11E is a diagram showing an example of content registered in the recipe member DB 12c. In the recipe member DB 12c, recipe member information related to use of the recipe site by users is registered. Specifically, in the recipe member DB 12c, a user ID, a feeling degree, a recipe ID, and a report ID are registered in association with each other. The feeling degree is the feeling degree specified by a user when the user searches for a recipe. When the system control unit 14 receives a recipe search request from the user terminal 4, the system control unit 14 registers the feeling degree in the recipe member DB 12c and searches for the recipe in parallel. The recipe ID indicates a recipe whose recipe page is displayed when the recipe is selected by the user from among the recipes searched for and found by the specified feeling degree. The report ID is identification information of a cooking report posted by a user to the recipe indicated be the recipe ID. Information of the cooking report is stored in the storage unit 12.

Next, other information stored in the storage unit 12 will be described. The storage unit 12 stores various data such as HTML (HyperText Markup Language) documents for displaying web pages, XML (Extensible Markup Language) documents, image data, text data, and electronic documents. The storage unit 12 also stores various setting values. Each of the recipe information stored in the storage unit 12 and the HTML document of the recipe page is an example of a recipe stored in the storage means of the present invention.

Further, the storage unit 12 stores various programs which are an operating system, a WWW (World Wide Web) server program, a DBMS (Database Management System), a recipe management program, and the like. The recipe management program is a program for performing various processes related to the recipe site. The recipe management program is an example of an information processing program of the present invention. For example, the various programs may be acquired from another server device or the like through the network NW or may be recorded in a recording medium such as a DVD (Digital Versatile Disc) and read through a drive device.

The input/output interface 13 performs interface processing among the communication unit 11, the storage unit 12, and the system control unit 14.

The system control unit 14 includes a CPU (Central Processing Unit) 14a, a ROM (Read Only Memory) 14b, a RAM (Random Access Memory) 14c, and the like. In the system control unit 14, the CPU 14a reads and executes various programs, so that the system control unit 14 functions as a first acquisition means, a second acquisition means, a search means, and a presentation means of the present invention.

The recipe server 1 may include a plurality of server devices. For example, a server device that performs registration, search, and the like of the recipe information, a server device that transmits a web page of the recipe site according to a request from the user terminal 4, a server device that manages database, and the like may be connected to each other by a LAN or the like.

1-4-2. Configuration of Net Supermarket Server

The net supermarket server 2 includes a system control unit including a CPU and the like, a storage unit including a hard disk drive and the like, a communication unit, and the like. In the storage unit of the net supermarket server 2, the items-for-sale information DB 2a is constructed.

FIG. 11F is a diagram showing an example of content registered in the items-for-sale information DB 2a. In the items-for-sale information DB 2a, items-for-sale information is registered. Specifically, in the items-for-sale information DB 2a, attributes of items for sale such as a shop ID, an item ID, a category ID, an item name, a URL of item for sale image, an item description, an amount, and an item price are registered in association with each other for each item for sale sold by a shop. The shop ID is identification information of the shop which sells the item for sale. The item ID is identification information of item for sale for a shop to manage the item for sale sold by the shop. The category ID indicates a category to which the item for sale belongs.

1-4-3. Configuration of Member Information Management Server

The member information management server 3 includes a system control unit including a CPU and the like, a storage unit including a hard disk drive and the like, a communication unit, and the like. In the storage unit of the member information management server 3, the member information DB 3a is constructed.

FIG. 11G is a diagram showing an example of content registered in the member information DB 3a. In the member information DB 3a, member information related to users registered in the service providing site as a member is registered. Specifically, in the member information DB 12a, user attributes such as a user ID, a password, a nickname, a name, a date of birth, a gender, a postal code, an address, a phone number, and an email address are registered in association with each other for each user.

1-5. Operation of Information Processing System

Next, an operation of the information processing system S will be described with reference to FIGS. 12 to 15.

FIG. 12 is a flowchart showing a process example of a recipe registration process of the system control unit 14 of the recipe server 1 according to the present embodiment. A user posts a recipe in the recipe site. Specifically, the user operates the user terminal 4 and inputs a recipe title, a dish name, a cooking time, the number of target people, an ingredient cost, ingredient names, amounts of ingredients, procedure texts, and a comment. The user specifies a category, a dish image, and a procedure image. The user terminal 4 transmits a recipe registration request to the recipe server 1. The recipe registration request includes the information inputted by the user and the information specified by the user. The recipe registration process is started when the recipe server 1 receives the recipe registration request.

As shown in FIG. 12, the system control unit 14 calculates a feeling degree of the original recipe (step S1). Specifically, the system control unit 14 determines the number of points of each ingredient on the basis of the ingredient names included in the recipe registration request. Then, the system control unit 14 sums up the determined numbers of points to calculate the feeling degree corresponding to the number of ingredients. Further, the system control unit 14 determines the feeling degree corresponding to the number of procedures according to the number of procedure texts included in the recipe registration request. Further, the system control unit 14 determines the feeling degree corresponding to the cooking time included in the recipe registration request. Further, the system control unit 14 determines the degree of quality of ingredients on the basis of the number of target people and the ingredient cost included in the recipe registration request and calculates the feeling degree according to the degree of quality of ingredients. The system control unit 14 calculates the feeling degree of the original recipe by summing up each feeling degree.

If the user does not input the ingredient cost, the system control unit 14 acquires the ingredient cost from the net supermarket server 2. Specifically, the system control unit 14 transmits a request including the ingredient names and the amounts of ingredients to the net supermarket server 2. The net supermarket server 2 searches for item for sale information by using the ingredient names and the amounts of ingredients included in the request as a search condition. For example, the net supermarket server 2 searches for item for sale information in which the item name includes the ingredient name and the amount of the item for sale is similar to the amount of ingredient included in the request. Then, the net supermarket server 2 transmits the item price included in the found item for sale information to the recipe server 1. The recipe server 1 calculates the ingredient cost by summing up the item prices of each ingredient.

Next, the system control unit 14 registers the recipe information of the original recipe (step S2). Specifically, the system control unit 14 generates a new recipe ID and sets the recipe type to "original". Then, the system control unit 14 registers the recipe information in the recipe information DB 12a. The recipe information includes the recipe ID, the recipe type, the information included in the recipe registration request, and the calculated feeling degree.

Next, the system control unit 14 determines whether or not the conversion rule can be applied to the registered recipe information of the original recipe (step S3). Specifically, the system control unit 14 acquires the type of the attribute of the object to be converted and the keyword which is included in the recipe conversion information registered in the recipe conversion information DB 12b. Then, the system control unit 14 searches for an attribute including the keyword from among attributes which correspond to the type of the attribute of the object to be converted and which is included in the recipe information. At this time, if the system control unit 14 cannot find a corresponding attribute, the system control unit 14 determines that the conversion rule cannot be applied (step S3: NO). In this case, the system control unit 14 ends the recipe registration process. On the other hand, if the system control unit 14 can find a corresponding attribute, the system control unit 14 determines that the conversion rule can be applied (step S3: YES). In this case, the system control unit 14 proceeds to step S4.

In step S4, the system control unit 14 converts the recipe information of the original recipe on the basis of the conversion rule that can be applied and generates recipe information of a conversion copy. Specifically, the system control unit 14 copies the recipe information of the original recipe. Next, the system control unit 14 rewrites content of the copy of the recipe information on the basis of the type of the attribute of the object to be converted, the conversion method, and content of the attribute after conversion, which are included in the conversion rule information. Thereby, the system control unit 14 generates the recipe information of the conversion copy.

Next, the system control unit 14 calculates the feeling degree of the conversion copy by summing up the feeling degree of the original recipe and the feeling degree included in the conversion rule information (step S5). Then, the system control unit 14 rewrites the feeling degree included in the recipe information of the conversion copy.

Next, the system control unit 14 rewrites the recipe type included in the recipe information of the conversion copy from "original" to "conversion copy". Then, the system control unit 14 registers the recipe information of the conversion copy in the recipe information DB 12a (step S6). After completing this process, the system control unit 14 ends the recipe registration process.

The system control unit 14 may perform the processes of steps S4 to S6 for each conversion rule that can be applied.

FIG. 13 is a flowchart showing a process example of a recipe search process of the system control unit 14 of the recipe server 1 according to the present embodiment. When a user selects the search button 102 on the top page or the user selects a link in the category specification area 104 or when the user inputs an ingredient name on the detailed search page, the user terminal 4 transmits a search request to the recipe server 1. The search request includes the specified search condition, the feeling degree according to the position of the tab 106, and the user ID of the user who uses the user terminal 4. The user who uses the user terminal 4 that transmits a request is referred to as a "request user". The recipe search process is started when the recipe server 1 receives the search request. The system control unit 14, which functions as the first acquisition means, receives the search request, so that the system control unit 14 acquires the feeling degree specified by the user.

As shown in FIG. 13, the system control unit 14 normalizes the feeling degree included in the search request (step S31). Next, the system control unit 14 searches for recipes that satisfy the search condition other than the feeling degree (step S32). For example, when a keyword is specified as the search condition, the system control unit 14 searches for recipe information in which at least any one of the recipe title, the dish name, and the procedure text includes a keyword. When a category is specified as the search condition, the system control unit 14 searches for recipe information of a recipe that belongs to the specified category. When an ingredient name is specified as the search condition, the system control unit 14 searches for recipe information that includes an ingredient name corresponding to the specified ingredient name. When the system control unit 14 searches for recipe information, the system control unit 14 generates a search result list showing a list of the found recipe information. Specifically, the system control unit 14, which functions as the second acquisition means, acquires the recipe ID, the recipe type, the copy number, and the feeling degree from the found recipe information of the recipe. Then, the system control unit 14 generates the search result list including the acquired information.

Next, the system control unit 14 stores the search result list in the storage unit 12 in association with the user ID of the request user included in the search request (step S33). The reason why this process is performed is to make it possible for the system control unit 14 to use the search result list later.

Next, the system control unit 14, which functions as the search means, extracts recipes, where the feeling degree included in the recipe information is within a range according to the feeling degree specified by the user, from among the found recipes (step S34). Next, the system control unit 14 extracts the original recipes from the extracted recipe information (step S35). The original recipe is a recipe whose recipe type is set to "original".

Next, the system control unit 14 determines whether or not the number of the extracted original recipes is greater than a set number stored in the storage unit 12 (step S36). At this time, if the system control unit 14 determines that the number of the original recipes is greater than the set number (step S36: YES), the system control unit 14 proceeds to step S37. On the other hand, if the system control unit 14 determines that the number of the original recipes is smaller than or equal to the set number (step S36: NO), the system control unit 14 proceeds to step S38.

In step S37, the system control unit 14 generates an HTML document of the search result page including the extracted original recipes as a search result. Next, the system control unit 14 proceeds to step S39. In step S38, the system control unit 14 generates an HTML document of the search result page including the recipes extracted in step S34 as a search result. In other words, the system control unit 14 generates an HTML document of the search result page including the original recipes and the conversion copies as a search result. Next, the system control unit 14 proceeds to step S39.

In step S39, the system control unit 14 transmits the generated HTML document to the user terminal 4 that is the transmitter of the search request. After completing this process, the system control unit 14 ends the recipe search process.

The user terminal 4, which has received the HTML document, displays a search result page on a screen on the basis of the HTML document, for example, as shown in FIG. 4A or 4B or FIG. 7. On the search result page, when a user selects the recipe title link 212 in any one of the found recipe display areas 211, the user terminal 4 transmits a recipe page request to the recipe server 1. The recipe page request includes a URL of the recipe page of the recipe corresponding to the selected recipe title link 212. The system control unit 14 of the recipe server 1 that receives the recipe page request generates an HTML document of the recipe page corresponding to the URL included in the recipe page request on the basis of the recipe information including the recipe ID, the recipe type, and the copy number identified from the URL. At this time, if the system control unit 14 generates an HTML document of a recipe page of a conversion copy, the system control unit 14 adds a conversion message into the HTML document. Further, the system control unit 14 adds data to display a balloon, a deletion frame, and the like into the HTML document on the basis of conversion content of the recipe information. The system control unit 14 transmits the generated HTML document to the user terminal 4. The user terminal 4, which has received the HTML document, displays a recipe page on a screen on the basis of the HTML document, for example, as shown in FIG. 5, 8, or 9. In this way, the system control unit 14, which functions as the presentation means, causes the user terminal 4 to present the recipe to the user.

Figure 14:
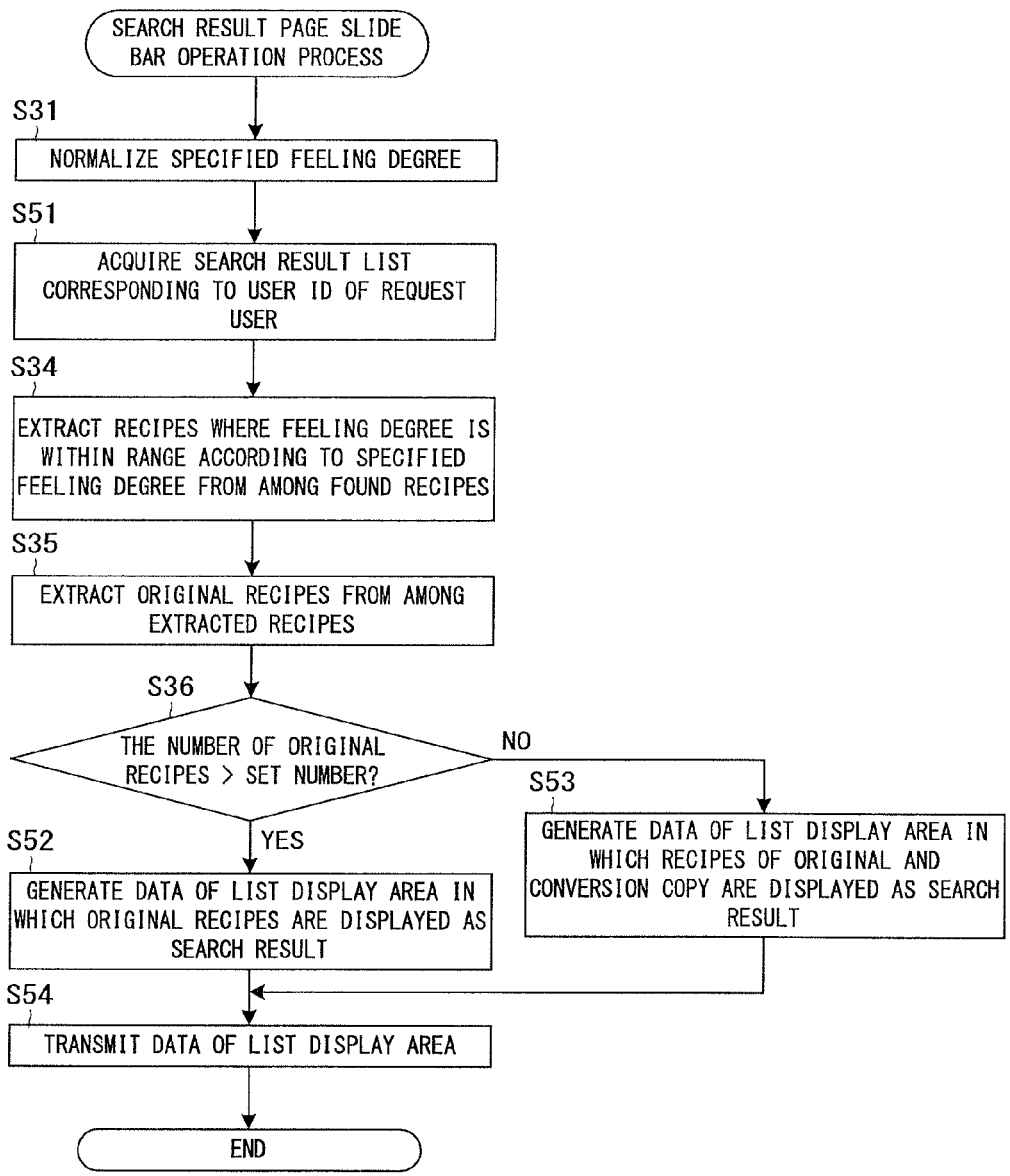
FIG. 14 is a flowchart showing a process example of a search result page slide bar operation process of the system control unit 14 of the recipe server 1 according to the embodiment.

FIG. 14 is a flowchart showing a process example of a search result page slide bar operation process of the system control unit 14 of the recipe server 1 according to the present embodiment. In FIG. 14, the same processes as those in FIG. 13 are denoted by the same reference numerals. On the search result page, when a user moves the tab 106 of the slide bar 105, the user terminal 4 transmits a search result change request to the recipe server 1. The change request includes the feeling degree according to the position of the moved tab 106 and the user ID of the request user. The search result page slide bar operation process is started when the recipe server 1 receives the search result change request.

As shown in FIG. 14, the system control unit 14 normalizes the feeling degree included in the search result change request (step S31). Next, the system control unit 14 acquires a search result list corresponding to the user ID included in the search result change request from the storage unit 12 (step S51). Next, the system control unit 14 performs steps S34 to S36 on the basis of the acquired search result list. In step S34, the system control unit 14 extracts recipes where the feeling degree included in the recipe information is within a range according to the feeling degree changed by the user.

In step S36, if the system control unit 14 determines that the number of the original recipes is greater than the set number (step S36: YES), the system control unit 14 proceeds to step S52. On the other hand, if the system control unit 14 determines that the number of the original recipes is smaller than or equal to the set number (step S36: NO), the system control unit 14 proceeds to step S53.

In step S52, the system control unit 14 generates list display data to display the list display area 210 in which the extracted original recipes are displayed as a search result. Next, the system control unit 14 proceeds to step S54. In step S53, the system control unit 14 generates list display data to display the list display area 210 in which the recipes extracted in step S34 are displayed as a search result (step S53). Next, the system control unit 14 proceeds to step S54. In step S54, the system control unit 14 transmits the generated list display data to the user terminal 4 that is the transmitter of the search result change request. After completing this process, the system control unit 14 ends the search result page slide bar operation process.

The user terminal 4 that receives the list display data rewrites the HTML document of the currently displayed search result page on the basis of the list display data. Thereby, in the list display area 210, a list of recipes according to the changed feeling degree is displayed.

Figure 15:
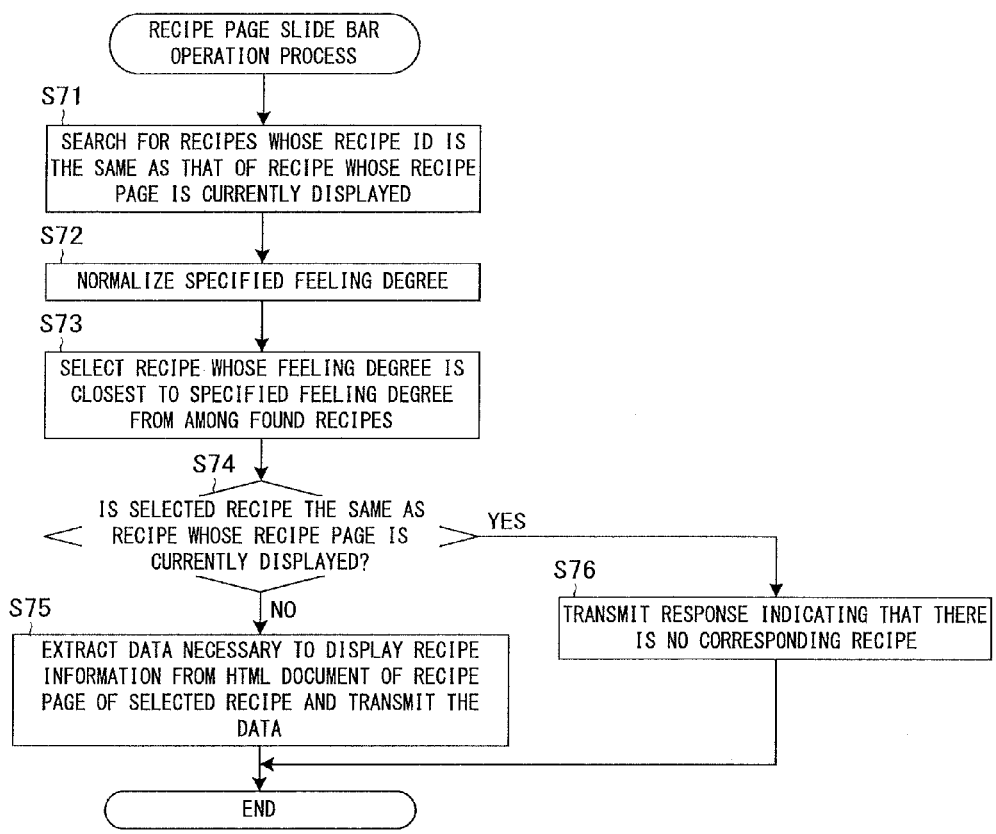
FIG. 15 is a flowchart showing a process example of a recipe page slide bar operation process of the system control unit 14 of the recipe server 1 according to the embodiment.

FIG. 15 is a flowchart showing a process example of a recipe page slide bar operation process of the system control unit 14 of the recipe server 1 according to the present embodiment. On the recipe page, when a user moves the tab 106 of the slide bar 105, the user terminal 4 transmits a recipe change request to the recipe server 1. The change request includes the feeling degree according to the position of the moved tab 106 and the user ID of the request user. The recipe page slide bar operation process is started when the recipe server 1 receives the recipe change request.

As shown in FIG. 15, the system control unit 14 searches for recipe information including the same recipe ID as that of the recipe whose recipe page is currently displayed from the recipe information DB 12a (step S71). Next, the system control unit 14 normalizes the feeling degree included in the recipe change request (step S72). Next, the system control unit 14 selects a recipe whose feeling degree included in the recipe information is closest to the feeling degree specified by the user from among the recipes whose recipe information is found in step S71 (step S73). Next, the system control unit 14 determines whether or not the selected recipe is the same as the recipe whose recipe page is currently displayed (step S74). At this time, if the system control unit 14 determines that the selected recipe is not the same as the recipe whose recipe page is currently displayed (step S74: NO), the system control unit 14 proceeds to step S75. On the other hand, if the system control unit 14 determines that the selected recipe is the same as the recipe whose recipe page is currently displayed (step S74: YES), the system control unit 14 proceeds to step S76.

In step S75, the system control unit 14 acquires the HTML document of the recipe page of the selected recipe from the storage unit 12. Next, the system control unit 14 extracts data necessary to display the recipe from the acquired HTML document. Next, the system control unit 14 transmits the extracted data to the user terminal 4 that is the transmitter of the recipe change request. After completing this process, the system control unit 14 ends the recipe page slide bar operation process. The user terminal 4 that receives the data necessary to display the recipe rewrites the HTML document of the currently displayed recipe page on the basis of the data. Thereby, content displayed on the recipe page is changed.

In step S76, the system control unit 14 transmits a response indicating that there is no corresponding recipe to the user terminal 4 that is the transmitter of the recipe change request. After completing this process, the system control unit 14 ends the recipe page slide bar operation process. The user terminal 4 that receives the response does not rewrite the HTML document of the recipe page.

As described above, according to the present embodiment, the system control unit 14 acquires the feeling degree specified by the user and the feeling degree calculated for each recipe on the basis of a plurality of attributes that can be identified from the recipes stored in the storage unit 12, searches for one or more recipes whose feeling degree within a range according to the feeling degree specified by the user is calculated, and causes the found recipes to be presented. Therefore, it is possible to present recipes according to a user's sensuous request reflecting how strongly a user feel for cooking.

Further, the system control unit 14 calculates an objective parameter as a feeling degree which indicates the time and effort to cook for each recipe on the basis of a plurality of attributes that affect the time and effort to cook. Therefore, regarding the time and effort to cook, the user need not input numerical values for each of a plurality of attributes such as the number of ingredients, the number of procedures, and the cooking time and may specify only the feeling degree. Therefore, it is possible to reduce the time and effort to specify the search condition. Further, the recipe server 1 need not perform a search process by using a search condition for each of the plurality of attributes. Therefore, it is possible to reduce the processing load of the recipe server 1.

Further, the system control unit 14 generates a conversion copy of a recipe whose feeling degree different from that of the original recipe is calculated by converting at least any one of procedures and ingredients included in the original recipe stored in the storage unit 12 into at least any one of replaceable procedures and ingredients. Therefore, even when there is no original recipe according to the feeling degree specified by the user, it is possible to cause a recipe according to the feeling degree specified by the user to be presented.

Further, the system control unit 14 searches for one or more original recipes whose feeling degree within a range according to the feeling degree specified by the user is calculated, and when the number of the found original recipes is smaller than or equal to a set number, the system control unit 14 searches for one or more conversion copies whose the feeling degree within the range according to the feeling degree specified by the user is calculated from among conversion copies. Therefore, it is possible to cause original recipes to be preferentially presented.

Further, the system control unit 14 causes a search result page on which the search result of recipes and the slide bar 105 are displayed to be presented and causes a recipe page of a recipe specified by the user from the search result to be presented, and when the feeling degree is changed by an operation of the slide bar 105 on the search result page, the system control unit 14 causes a search result of recipes whose feeling degrees within a range according to the changed feeling degree is calculated to be presented. Therefore, even when found recipes are not recipes desired by the user, it is possible to cause a search result of recipes desired by the user to be presented by a simple operation.

Further, the system control unit 14 causes a recipe page on which the found recipe and the slide bar 105 are displayed to be presented, and when the feeling degree is changed by an operation of the slide bar 105 on the recipe page, the system control unit 14 causes a recipe which is one of an original and a copy of the presented recipe displayed before and whose feeling degree within a range according to the changed feeling degree is calculated to be presented. Therefore, even when the presented recipe is not a recipe desired by the user, it is possible to change the recipe to a recipe desired by the user by a simple operation.

2. Second Embodiment

Next, an overview of a second embodiment will be described with reference to FIG. 16. In the second embodiment, the recipe server 1 weights each attribute used to calculate the feeling degree of a recipe on the basis of a recipe usage history of a user. Then, the recipe server 1 calculates the feeling degree on the basis of the weighted attributes. Description of the same points as those in the first embodiment will be omitted.

Even among a plurality of recipes whose feeling degrees are similar to each other, the feeling degree of each attribute with respect to the feeling degree of the entire recipe may be different for each recipe. Similarly, even among a plurality of users who specify a similar feeling degree, the users may value attributes differently. Therefore, the recipe server 1 weights an attribute that is assumed to be valued by a user and calculates the feeling degree of a recipe. Thereby, it is possible to search for a recipe more suited to the user.

The recipe server 1 determines an attribute valued by the user on the basis of attributes of a recipe used by the user in the past. As information indicating a recipe usage history, for example, there is a cooking report posting history. This is because the user cooked by using a recipe, so that the user posts a cooking report. The posting history is represented by the recipe member information registered in the recipe member DB 12c.

An example of a determination method of an attribute valued by a user will be described. In the description below, for ease of understanding, an example of a case in which an attribute valued by a user is determined from among the cooking time and the number of procedures will be described. In practice, the recipe server 1 determines an attribute valued by a user from among all the attributes used to calculate the feeling degree.

FIG. 16A is a diagram showing an example of attributes of two recipes of which a user posted cooking reports. For example, the user specifies 10 points as the feeling degree and searches for recipes and the found recipes is displayed. Then, user selects a recipe of which the cooking time and the number of procedures are, for example, 20 minutes and two procedures as shown in FIG. 16A. Further, the user specifies 30 points as the feeling degree and searches for recipes and the found recipes is displayed. Then, user selects a recipe of which the cooking time and the number of procedures are, for example, 40 minutes and five procedures as shown in FIG. 16A.

For example, when the cooking time is 15 minutes and the number of procedures is three, it is assumed that the cooking time and the number of procedures are equally valued. According to the calculation method shown in FIG. 2A, when a value obtained by multiplying the feeling degree corresponding to the cooking time by nine corresponds to the feeling degree corresponding to the number of procedures, the cooking time and the number of procedures are equally valued. The recipe server 1 multiplies each attribute by a normalization coefficient in order to easily compare the attributes with each other. For example, the normalization coefficient of the cooking time is 9 and the normalization coefficient of the number of procedures is 1.

FIG. 16B is an example of a graph showing a relationship between a feeling degree and cooking, and relationship between a feeling degree and the number of procedures. The graph is drawn so that the cooking time and the number of procedures which are equally valued have the same height. As shown in FIG. 16B, the user values the cooking time more than the number of procedures when the feeling degree is 10 points and when the feeling degree is 30 points.

The recipe server 1 defines a weight coefficient of a valued attribute to be, for example, 2. The recipe server 1 multiplies the feeling degree of the valued attribute by the weight coefficient. Then, the recipe server 1 calculates the feeling degree of the recipe by summing up the feeling degree in which the valued attribute is weighted and the feeling degrees of the other attributes. For example, when the user values the cooking time is 22.4 (=2.4+15+2×2+1), the feeling degree of the original "cooked taro".

FIG. 16C is a screen display example of the search result page. When the recipe server 1 calculates the feeling degree of a recipe by weighting any one of the attributes, a message 230 is displayed on the search result page. As the message 230, for example, "For ABC, the feeling degree is calculated by valuing XXXX." is displayed. The "ABC" is a nickname of the user. The "XXXX" is a name of the attribute valued by the user. If the user has never posted any cooking report, the message 230 is not displayed.

Figure 17:
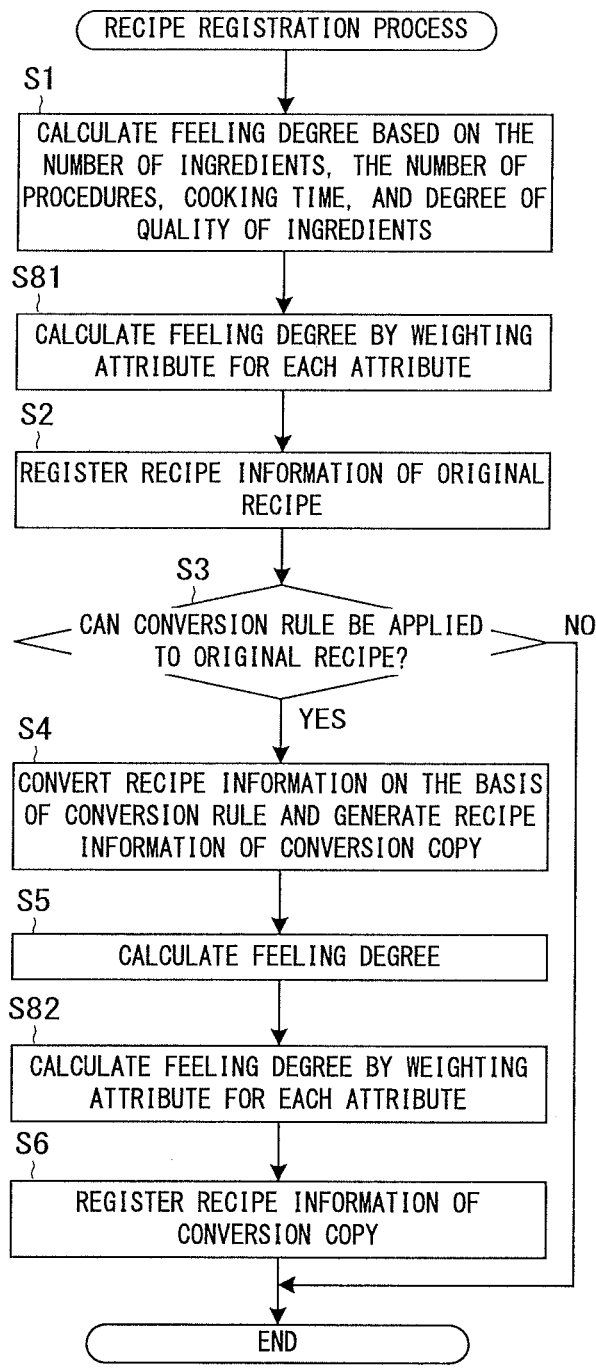
FIG. 17 is a flowchart showing a process example of a recipe registration process of a system control unit 14 of a recipe server 1 according to an embodiment.

Next, an operation of the information processing system S will be described with reference to FIGS. 17 and 18. FIG. 17 is a flowchart showing a process example of a recipe registration process of the system control unit 14 of the recipe server 1 according to the present embodiment. In FIG. 17, the same processes as those in FIG. 12 are denoted by the same reference numerals.

As shown in FIG. 17, the system control unit 14 calculates the feeling degree of an original recipe without weighting each attribute in step S1, and thereafter calculates the feeling degree of the original recipe by weighting an attribute for each attribute (step S81). Next, the system control unit 14 registers the recipe information of the original recipe (step S2). At this time, the system control unit 14 stores the feeling degrees corresponding to respective attributes and calculated without weighting into the recipe information. The system control unit 14 stores the feeling degree of the recipe which is calculated without weighting any attribute into the recipe information. The system control unit 14 stores the feeling degrees of the recipe which are calculated by weighting the attributes into the recipe information.

In step S5, the system control unit 14 calculates the feeling degree of a conversion copy without weighting each attribute, and thereafter calculates the feeling degree of the recipe of the conversion copy by weighting an attribute for each attribute (step S82). Next, the system control unit 14 registers the recipe information of the conversion copy (step S6). At this time, the system control unit 14 stores the feeling degrees corresponding to respective attributes and calculated without weighting into the recipe information. The system control unit 14 stores the feeling degree of the recipe which is calculated without weighting any attribute into the recipe information. The system control unit 14 stores the feeling degrees of the recipe which are calculated by weighting the attributes into the recipe information.

Figure 18:
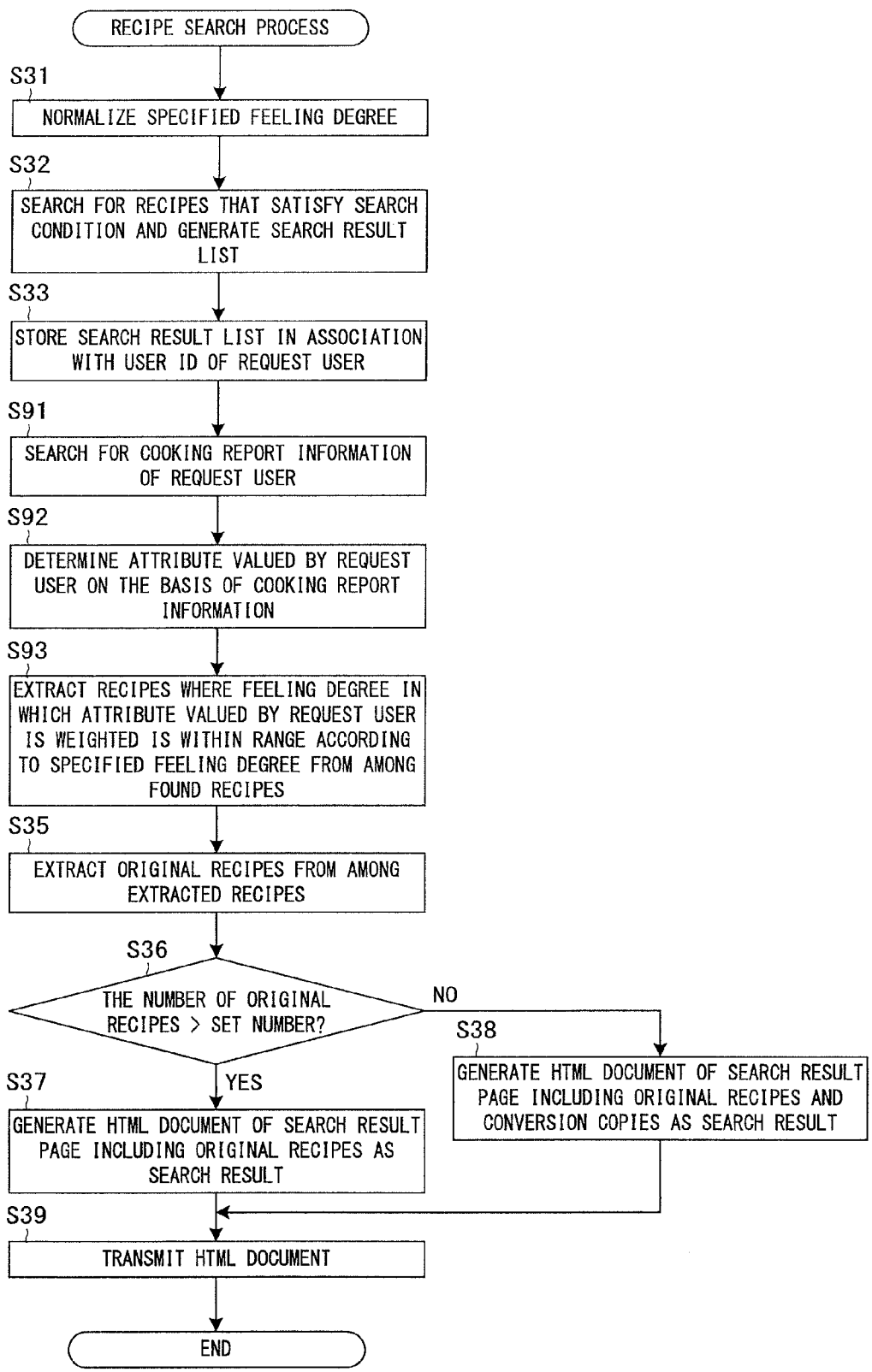
FIG. 18 is a flowchart showing a process example of a recipe search process of the system control unit 14 of the recipe server 1 according to the embodiment.

FIG. 18 is a flowchart showing a process example of a recipe search process of the system control unit 14 of the recipe server 1 according to the present embodiment. In FIG. 18, the same processes as those in FIG. 13 are denoted by the same reference numerals.

As shown in FIG. 18, after completing the process of step S33, the system control unit 14 searches for the recipe member information including the user ID of the request user from the recipe member DB 12c (step S91). Next, the system control unit 14 determines an attribute valued by the request user on the basis of the found recipe member information (step S92). Specifically, the system control unit 14 searches for the recipe information of the recipes used by the user from the recipe information DB 12a on the basis of the found recipe member information. Next, the system control unit 14 divides the feeling degrees corresponding to each attribute included in the recipe information by the feeling degree included in the recipe member information. Next, the system control unit 14 sums up the feeling degrees corresponding to an attribute for each attribute. Next, the system control unit 14 multiplies the total value of the feeling degrees of each attribute by a normalization coefficient for each attribute to calculate normalized feeling degrees. Next, the system control unit 14 determines the attribute where the normalized feeling degree is the highest to be the attribute valued by the request user.

Next, the system control unit 14 acquires the feeling degrees in which the attribute valued by the request user is weighted from the recipe information of the found recipes. Then, the system control unit 14 extracts recipes, where the feeling degree in which the attribute valued by the request user is weighted is within a range according to the feeling degree specified by the user, from among the found recipes (step S93). Next, the system control unit 14 proceeds to step S35.

Also in the search result page slide bar operation process and the recipe page slide bar operation process, in the same manner as in the recipe search process, the system control unit 14 performs a process based on the feeling degree in which the attribute valued by the request user is weighted.

As described above, according to the present embodiment, the system control unit 14 acquires the feeling degrees calculated by separately weighting a plurality of attributes on the basis of the recipe member information stored in the storage unit 12. Therefore, it is possible to cause a recipe suited to an individual user to be presented according to an attribute valued by the user.

In the embodiment described above, the history of use of the present invention is applied to the recipe member information. However, the history of use may be applied to other information. For example, the usage history may be applied to a cooking history. The cooking history is a history of cooking using a recipe. The cooking history includes a user ID of the user who cooked, a date when the cooking is notified, a recipe ID of the used recipe, a search condition specified to search for the used recipe, and the feeling degree. On the recipe page, a cooking notification button to notify the recipe site that the user cooked by using the recipe is provided. When the cooking notification button is selected, the recipe server 1 registers a cooking history in a database.

Further, the usage history may be applied to a browsing history of the recipe page. Seeing the recipe page is an example of the usage of the recipe. The browsing history includes a user ID of the user who browsed, a date of the browsing, a recipe ID of the browsed recipe, a search condition specified to search for the browsed recipe, and the feeling degree. Every time receiving a recipe page request, the recipe server 1 registers a browsing history in a database.

The recipe server 1 may determine an attribute valued by a user on the basis of a specification history of a sort condition of the search result on the search result page. As a sort condition that can be specified in a sort condition specification area 220, for example, there are an ascending order of the number of ingredients, a descending order of the number of ingredients, an ascending order of the cooking time, a descending order of the cooking time, an ascending order of the number of procedures, a descending order of the number of procedures, an ascending order of the cost of ingredients, and a descending order of the cost of ingredients. In other words, the user can specify the number of ingredients, the cooking time, the number of procedures, the degree of quality of ingredients, and the like as a sorting key. Every time a user specifies a sort condition in the sort condition specification area 220, the recipe server 1 registers a specification history of the sort condition in a database. The specification history includes a user ID of the user who specified the sort condition, a date of the specification, and the specified sort condition. For example, the recipe server 1 calculates the number of times when sorting is performed using the number of ingredients by summing up the number of times when sorting is performed in ascending order of the number of ingredients and the number of times when sorting is performed in descending order of the number of ingredients. Regarding the cooking time, the number of procedures, and the cost of ingredients, the recipe server 1 also calculates the number of times when sorting is performed in the same manner as that for the number of ingredients. Then, the recipe server 1 determines an attribute which the user most frequently specifies as the sort condition to be an attribute valued by the user.

The recipe server 1 may, for example, reduce the weight of an attribute that is not valued by the user. Further, the recipe server 1 may increase the weight of an attribute that is valued by the user and reduce the weight of an attribute that is not valued by the user.

Further, the recipe server 1 may determine the weight coefficient of each attribute on the basis of, for example, a rate of change of a value of an attribute with respect to the feeling degree specified by the user (the slope of the graph shown in FIG. 16B). For example, the recipe server 1 may determine the weight coefficient so that the greater the rate of change of the value of the attribute, the heavier the weight of the attribute, on the basis of a ratio of the rate of change between attributes. In this case, the value of the weight coefficient is determined for each user. Therefore, for example, when searching for recipes, the recipe server 1 calculates the feeling degree for each recipe by weighting the feeling degree of each attribute by the weight coefficient corresponding to the request user.

Further, the recipe server 1 may make it possible for the user to specify the weight of each attribute. For example, slide bars of each attribute are displayed on the top page and the search result page in addition to the slide bar 105. The user can specify a weight for each attribute by operating the slide bars of each attribute. When the user terminal 4 transmits a search request, the user terminal 4 stores a weight coefficient corresponding to the position of the tab of the slide bar into the search request. After searching for and retrieving recipes that satisfy the search condition, the recipe server 1 calculates the feeling degrees of the found recipes on the basis of the recipe information of the recipes and the weight coefficient of each attribute included in the search request.

3. Third Embodiment

Next, an overview of a third embodiment will be described with reference to FIG. 19. In the third embodiment, when the feeling degree specified by the user is smaller than or equal to a predetermined threshold value, the recipe server 1 causes the user terminal 4 to present information recommending use of a home delivery service of food. Description of the same points as those in the first embodiment will be omitted.

When the feeling degree specified by the user is considerably low, there is a probability that the user wants to eat a meal but thinks it is very troublesome to make a dish. Therefore, the recipe server 1 proposes a method for the user to eat a meal without making a dish. An example of this method is to use a home delivery service of food. A shop which provides a home delivery service is called a "home delivery shop". The recipe server 1 searches for home delivery shops that can be used by the user and causes the user terminal 4 to present information of the found home delivery shops.

In the storage unit 12, a database in which home delivery shop information is registered is constructed. The home delivery shop information includes, for example, a shop name of the home delivery shop, an address, a phone number, a delivery area, a menu, a text introducing the home delivery shop, a URL of a web page of the home delivery shop.

Figure 19:
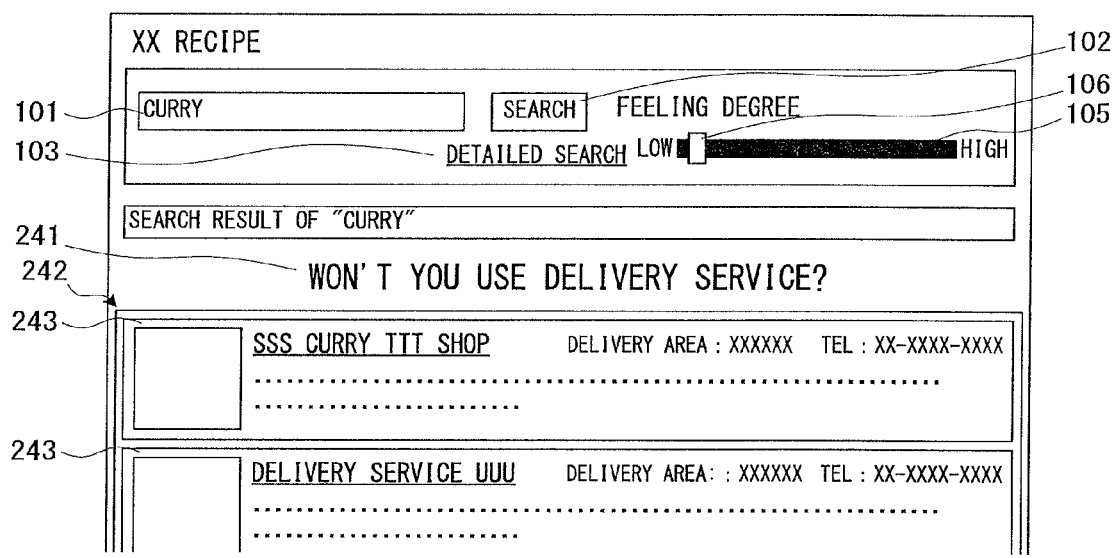
FIG. 19 is a diagram showing a display example of a search result page.

FIG. 19 is a diagram showing a display example of a search result page. When the feeling degree specified by the user is smaller than or equal to a threshold value, the search result page as shown in FIG. 19 is displayed. As shown in FIG. 19, on the search result page, a keyword input area 101, a search button 102, a detailed search link 103, a slide bar 105, a recommendation message 241, and a list display area 242 are displayed. The recommendation message 241 is a message that recommends use of a home delivery service of food. In the list display area 242, a list of home delivery shops is displayed. Specifically, in the list display area 242, a found home delivery shop display area 243 is displayed for each found home delivery shop. In the found home delivery shop display area 243, a name of the home delivery shop, a category of dishes delivered by the home delivery shop, a delivery area, a phone number, an introduction of the home delivery shop, and the like are displayed. When the user selects the name of the home delivery shop, a web page of the selected home delivery shop is displayed. When there are recipes according to the feeling degree specified by the user, the recipe server 1 may cause a list of found recipes and a list of the home delivery shops to be displayed on the search result page. The recipe server 1 may cause a list of the home delivery shops to be displayed only when there is no recipe according to the feeling degree specified by the user.

Figure 20:
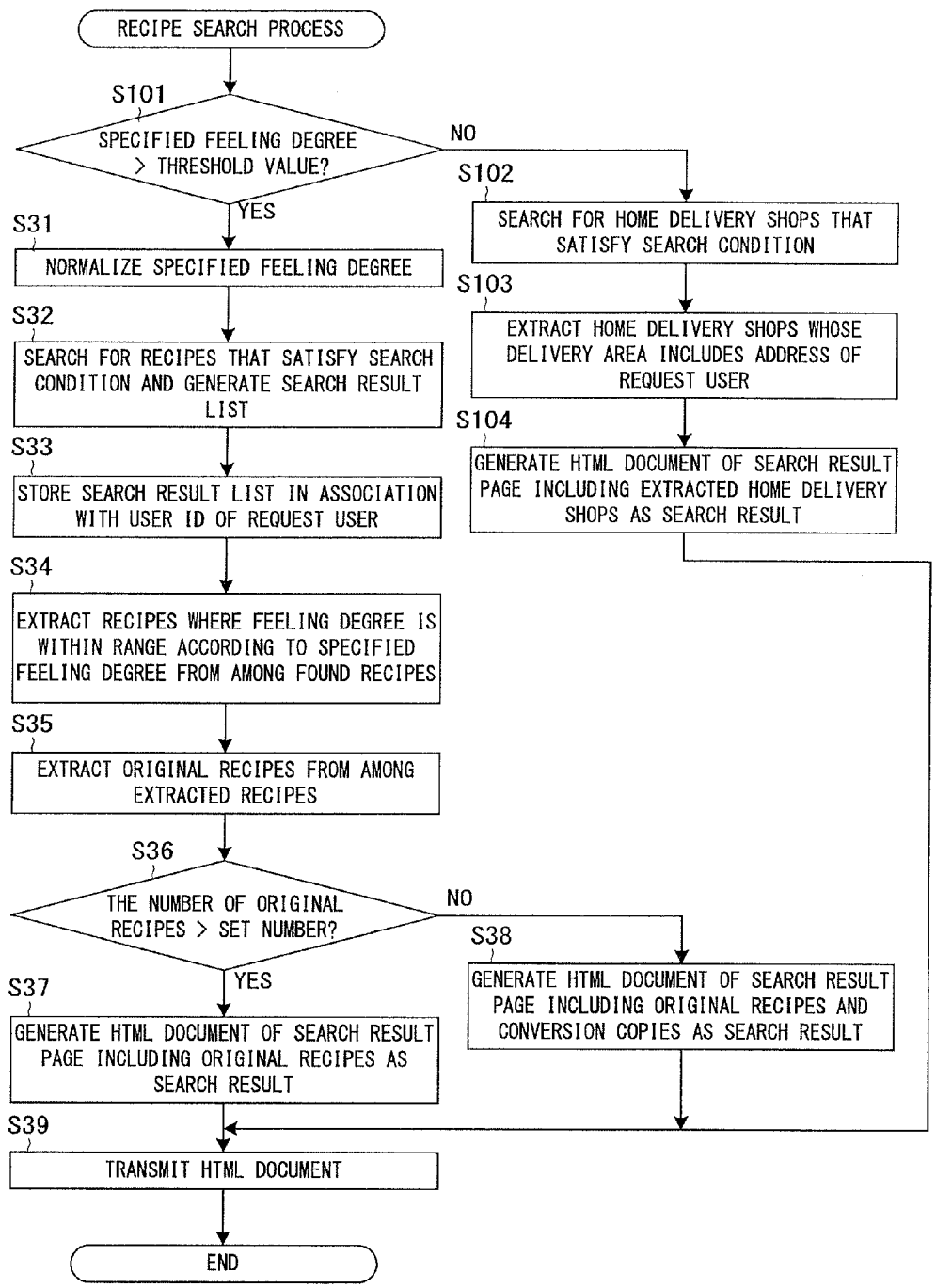
FIG. 20 is a flowchart showing a process example of a recipe search process of the system control unit 14 of the recipe server 1 according to an embodiment.

Next, an operation of the information processing system S will be described with reference to FIG. 20. FIG. 20 is a flowchart showing a process example of a recipe search process of the system control unit 14 of the recipe server 1 according to the present embodiment. In FIG. 20, the same processes as those in FIG. 13 are denoted by the same reference numerals.

As shown in FIG. 20, the system control unit 14 determines whether or not the feeling degree specified by the user is greater than a threshold value (step S101). At this time, if the system control unit 14 determines that the feeling degree is greater than the threshold value (step S101: YES), the system control unit 14 proceeds to step S31. On the other hand, if the feeling degree is smaller than or equal to the threshold value (step S101: NO), the system control unit 14 proceeds to step S102.

In step S102, the system control unit 14 searches for home delivery shops that satisfy a search condition specified by the user. For example, when a keyword or an ingredient name is specified as the search condition, the system control unit 14 searches for home delivery shops where at least any one of the name of the home delivery shop, the menu, and the text of introduction includes the keyword or the ingredient name. When a category is specified as the search condition, the system control unit 14 searches for home delivery shops that deliver dishes of the specified category.

Next, the system control unit 14 extracts home delivery shops whose delivery area includes the address of the user from among the found home delivery shops (step S103). Next, the system control unit 14 generates an HTML document of a search result page including the extracted home delivery shops as a search result (step S104). Next, the system control unit 14 transmits the generated HTML document (step S39).

As described above, according to the present embodiment, when the feeling degree specified by the user is smaller than or equal to the threshold value, the system control unit 14 causes information that recommends use of a home delivery service of food is presented. Therefore, it is possible for the user to select a method in which the user need not make a dish when the user thinks it is troublesome to make a dish.

In the embodiments described above, the recipe server 1 may generate a recipe including information recommending the user to purchase ingredients from a net supermarket from the original recipe. In this case, the recipe server 1 makes the feeling degree of the recipe lower than the original feeling degree. The reason of this is because the user purchases ingredients from the net supermarket, so that the user need not go out to purchase the ingredients. In other words, the reason of this is because the user can reduce the time and effort to purchase the ingredients. For example, the feeling degree is decreased by 3 point. The recipe server 1 may generate in advance the recipe information and the recipe page of the recipe that recommend the user to purchase ingredients from the net supermarket, for example, when the recipe is posted.

FIG. 21A is a diagram showing a display example of the recipe page. The recipe page that recommends purchase of ingredients from the net supermarket includes a purchase button 351 and a balloon 352. The purchase button 351 is a button to purchase ingredients used in the recipe. In the balloon 352, as information for recommending purchase of ingredients from the net supermarket, for example, a text such as "If you purchase ingredients from the net supermarket, you can easily purchase the ingredients!" is displayed. When the user selects the purchase button 351, the ingredients of the recipe are added to a shopping cart as items for sale by the net supermarket server 2. Then, a shopping cart page is displayed on a screen of the user terminal 4. The shopping cart is a virtual container in which items for sale which the user determines to purchase are put. The shopping cart page is a web page on which a list of the items for sale added to the shopping cart by the user is displayed. Specifically, when the purchase button 351 is selected, the user terminal 4 transmits a request including the ingredient names of the ingredients and the amounts of ingredients to the net supermarket server 2. The net supermarket server 2 searches for item for sale information by using the ingredient names and the amounts of ingredients included in the request as a search condition. Then, the net supermarket server 2 performs a process to add one item for sale to the shopping cart for each ingredient from among the items for sale whose item for sale information is found. Next, the net supermarket server 2 transmits the shopping card page to the user terminal 4. The information for recommending purchase of ingredients from the net supermarket may be displayed in the found recipe display area 211 on the search result page.

FIG. 21B is a diagram showing a display example of the shopping cart page. As shown in FIG. 21B, on the shopping cart page, a list of items for sale added to the shopping cart and an account button 401 are displayed. Items that need not be purchased, such as condiments and water, are not added to the shopping cart. FIG. 21B is an example of a case in which the taro and the granular soup are added to the shopping cart from among the ingredients of the "cooked taro". When the user performs a purchase procedure after selecting the account button, the user can purchase the items for sale added to the shopping cart.

The recipe server 1 may generate a recipe including information recommending the user to request someone to cook a dish by transmitting a cooking request email. Also in this case, the recipe server 1 makes the feeling degree of the recipe lower than the original feeling degree. The reason of this is because the user can save the time and effort of making a dish. For example, the feeling degree is decreased by 20 point. The recipe server 1 may generate in advance the recipe information and the recipe page of the recipe that recommend the user to request someone to cook a dish, for example, when the recipe is posted.

FIG. 21C is a diagram showing a display example of the recipe page. The recipe page that recommends the user to request someone to cook a dish includes a balloon 361. In the balloon 361, as information for recommending the user to request someone to cook a dish, for example, a text such as "If you request someone to cook a dish, you can save the time and effort to cook a dish!" is displayed. The balloon 361 indicates the cooking request email button 321. The information for recommending the user to request someone to cook a dish may be displayed in the found recipe display area 211 on the search result page.

In the above embodiments, the recipe server 1 automatically performs conversion of recipe regardless of the intention of the user who posted the recipe. However, the recipe server 1 may be configured so that the user can set the conversion content of the recipe. For example, when posting a recipe, the user sets an attribute to be converted, content of attribute after conversion, and the feeling degree to be increased or to be decreased. The recipe server 1 generates an HTML document of the recipe information and the recipe page of a conversion copy converted from the original recipe on the basis of the setting of the user. When the recipe server 1 generates the HTML document of the recipe page of the conversion copy, the recipe server 1 may directly change the procedure display field 310 and the information of the ingredients displayed in the ingredient display field 306 instead of generating the HTML document so that content of change is displayed in a balloon. The reason of this is because the posting person allows the conversion of the recipe and the posting person recognizes the content of change.

In the above embodiments, the recipe server 1 calculates the feeling degree on the basis of the attributes that affect the time and effort, and the degree of quality of ingredients. However, the recipe server 1 may calculate the feeling degree on the basis of a plurality of attributes that affect the time and effort and calculate the degree of quality of ingredients separately from the feeling degree. Further, the recipe server 1 may make it possible for the user to specify the feeling degree and the degree of quality of ingredients separately from each other. Specifically, on the top page, the search result page and the recipe page, a slide bar to specify the feeling degree and a slide bar to specify the degree of quality of ingredients are displayed separately. When the user terminal 4 transmits a search request, the user terminal 4 adds the feeling degree and the degree of quality of ingredients respectively corresponding to the positions of the tabs of the slide bars into the search request. The recipe server 1 searches for recipes in which the feeling degree within a range according to the specified feeling degree is calculated and the degree of quality within a range according to the specified degree of quality is calculated.

Further, when the recipe server 1 transmits the HTML document of the search result page to the user terminal 4, the recipe server 1 may add a script into the HTML document of the search result page. The script is for the user terminal 4 to search for recipes according to the feeling degree changed by an operation of the slide bar 105 displayed on the search result page and rewrite the HTML document of the search result page. Further, the recipe server 1 may add information necessary to search for the recipes and rewrite the HTML document into the HTML document of the search result page.

Further, when the recipe server 1 transmits the HTML document of the recipe page to the user terminal 4, the recipe server 1 may add a script into the HTML document of the recipe page. The script is for the user terminal 4 to rewrite the HTML document of the recipe page by content of a recipe according to the feeling degree changed by an operation to the slide bar 105 displayed on the recipe page. Further, the recipe server 1 may add information necessary to rewrite the HTML document into the HTML document of the recipe page.

In the embodiments described above, the slide bar 105 is displayed on each of the top page, the search result page, and the recipe page. However, the slide bar 105 maybe, for example, displayed on the top page only. The widget for specifying the feeling degree may be, for example, an input area where the feeling degree is inputted as a numerical value. The recipe server 1 need not necessarily perform the recipe conversion. The management of the recipe site and the management of the net supermarket may be different from each other.

REFERENCE SIGNS LIST

1 Recipe server
2 Net supermarket server
2*a* Items-for-sale information DB
3 Member information management server
3*a* Member information DB
4 User terminal
5 Net supermarket server
11 Communication unit
12 Storage unit
12*a* Recipe information DB
12*b* Recipe conversion information DB
12*c* Recipe member DB
13 Input/output interface
14 System control unit
14*a* CPU
14*b* ROM
14*c* RAM
15 System bus
NW Network
S Information processing system

The invention claimed is:

1. An information processing apparatus comprising:
a first acquisition unit, implemented by at least one hardware processor, that acquires a first feeling degree specified by a user as a degree of strength of feelings for cooking, the first feeling degree being a numerical value specified by the user to express the degree of strength of feelings for cooking;
a second acquisition unit, implemented by said at least one hardware processor, that acquires a second feeling degree of each recipe, among a plurality of recipes, on the basis of a plurality of different types of attributes of the corresponding recipe, the second feeling degree being calculated as a degree of strength of feelings for cooking associated with the corresponding recipe, and the second feeling degree being calculated by using a plurality of third feeling degrees that correspond to the respective plurality of different types of attributes identified from the corresponding recipe stored in a storage unit, the plurality of third feeling degrees being comparable with each other;

a search unit, implemented by said at least one hardware processor, that searches for one or more recipes, among the plurality of recipes, whose calculated second feeling degrees are within a range according to the first feeling degree; and a presentation unit that causes the one or more recipes found by the search unit to be presented.

2. The information processing apparatus according to claim 1, further comprising:

a generation unit, implemented by said at least one hardware processor, that converts at least one of a procedure and an ingredient included in an original recipe stored in the storage unit into a replaceable procedure or ingredient and thereby generates a replacement recipe whose second feeling degree is different from the second feeling degree of the original recipe, wherein the presentation unit is configured to cause the replacement recipe generated by the generation unit to be presented.

3. The information processing apparatus according to claim 2, wherein the search unit searches for one or more original recipes whose calculated second feeling degrees are within the range, and when the number of the original recipes found is smaller than or equal to a preset number, the search unit searches for one or more replacement recipes generated by the generation unit, the calculated second feeling degrees of the one or more replacement recipes to be searched for being within the range.

4. The information processing apparatus according to claim 3, wherein the presentation unit causes a recipe among the one or more recipes found by the search unit to be presented together with a widget including pointer that is able to be slid by the user to change the first feeling degree, and when the first feeling degree is changed by an operation of the widget displayed together with the recipe among the one or more recipes, the presentation unit causes a certain recipe to be presented, the certain recipe being one of a copy and an original of the recipe presented before, the calculated second feeling degree of the certain recipe being within a range according to the changed first feeling degree.

5. The information processing apparatus according to claim 3, wherein the second acquisition unit acquires the second feeling degree calculated by weighting each of the plurality of different types of attributes by a weight based on a designation history of the user designating an attribute as a key for sorting the one or more recipes found by the search unit, the designation history being stored in the storage unit.

6. The information processing apparatus according to claim 3, wherein the second acquisition unit acquires the second feeling degree calculated by weighting each of the plurality of different types of attributes by a weight based on a use history of the user using the one or more recipes, the use history being stored in the storage unit.

7. The information processing apparatus according to claim 2, wherein the presentation unit causes a recipe among the one or more recipes found by the search unit to be presented together with a widget including pointer that is able to be slid by the user to change the first feeling degree, and when the first feeling degree is changed by an operation of the widget displayed together with the recipe among the one or more recipes, the presentation unit causes a certain recipe to be presented, the certain recipe being one of a copy and an original of the recipe presented before, the calculated second feeling degree of the certain recipe being within a range according to the changed first feeling degree.

8. The information processing apparatus according to claim 7, wherein the second acquisition unit acquires the second feeling degree calculated by weighting each of the plurality of different types of attributes by a weight based on a designation history of the user designating an attribute as a key for sorting the one or more recipes found by the search unit, the designation history being stored in the storage unit.

9. The information processing apparatus according to claim 7, wherein the second acquisition unit acquires the second feeling degree calculated by weighting each of the plurality of different types of attributes by a weight based on a use history of the user using the one or more recipes, the use history being stored in the storage unit.

10. The information processing apparatus according to claim 2, wherein the second acquisition unit acquires the second feeling degree calculated by weighting each of the plurality of different types of attributes by a weight based on a designation history of the user designating an attribute as a key for sorting the one or more recipes found by the search unit, the designation history being stored in the storage unit.

11. The information processing apparatus according to claim 2, wherein the second acquisition unit acquires the second feeling degree calculated by weighting each of the plurality of different types of attributes by a weight based on a use history of the user using the one or more recipes, the use history being stored in the storage unit.

12. The information processing apparatus according to claim 1, wherein the second acquisition unit acquires the second feeling degree calculated by weighting each of the plurality of different types of attributes by a weight based on a designation history of the user designating an attribute as a key for sorting the one or more recipes found by the search unit, the designation history being stored in the storage unit.

13. The information processing apparatus according to claim 12, wherein the second acquisition unit acquires the second feeling degree calculated by weighting each of the plurality of different types of attributes by a weight based on a use history of the user using the one or more recipes, the use history being stored in the storage unit.

14. The information processing apparatus according to claim 1, wherein
the second acquisition unit acquires the second feeling degree calculated by weighting each of the plurality of different types of attributes by a weight based on a use history of the user using the one or more recipes, the use history being stored in the storage unit.

15. The information processing apparatus according to claim 1, wherein
the presentation unit causes a search result of recipes found by the search unit to be presented together with a widget including pointer that is able to be slid by the user to change the first feeling degree,
the presentation unit causes a recipe specified by the user from the search result to be presented, and
when the first feeling degree is changed by an operation of the widget displayed together with the search result, the presentation unit causes a search result of certain recipes to be presented, the calculated second feeling degree of the certain recipes being within a range according to the changed first feeling degree.

16. The information processing apparatus according to claim 1, wherein
when the first feeling degree acquired by the first acquisition unit is smaller than or equal to a preset threshold value, the presentation unit causes information recommending using of a home delivery service of food to be presented.

17. The information processing apparatus according to claim 1, wherein
the second feeling degree is calculated based on the plurality of different types of attributes including an attribute that affects time and effort to cook.

18. The information processing apparatus according to claim 1, wherein
the second feeling degree is calculated based on the plurality of different types of attributes including a degree of quality of ingredients used for cooking.

19. The information processing apparatus according to claim 1, wherein:
each of the plurality of third feeling degrees is acquired by normalizing a value of a corresponding attribute among the plurality of different types of attributes, and the second feeling degree is calculated by adding the plurality of third feeling degrees.

20. An information processing method performed by a computer, the method comprising:
a first acquisition step of acquiring a first feeling degree specified by a user as a degree of strength of feelings for cooking, the first feeling degree being a numerical value specified by the user to express the degree of strength of feelings for cooking;
a second acquisition step of acquiring a second feeling degree of each recipe, among a plurality of recipes, on the basis of a plurality of different types of attributes of the corresponding recipe, the second feeling degree being calculated as a degree of strength of feelings for cooking associated with the corresponding recipe, and the second feeling degree being calculated by using a plurality of third feeling degrees that correspond to the respective plurality of different types of attributes identified from the corresponding recipe stored in a storage unit, the plurality of third feeling degrees being comparable with each other;
a search step searching for one or more recipes, among the plurality of recipes, whose calculated second feeling degrees are within a range according to the first feeling degree; and
a presentation step causing the one or more recipes found in the search step to be presented.

* * * * *